B. P. HAYES & F. D. LAUGHLIN.
ADDING MACHINE.
APPLICATION FILED DEC. 6, 1915.
1,285,156.
Patented Nov. 19, 1918.
9 SHEETS—SHEET 1.
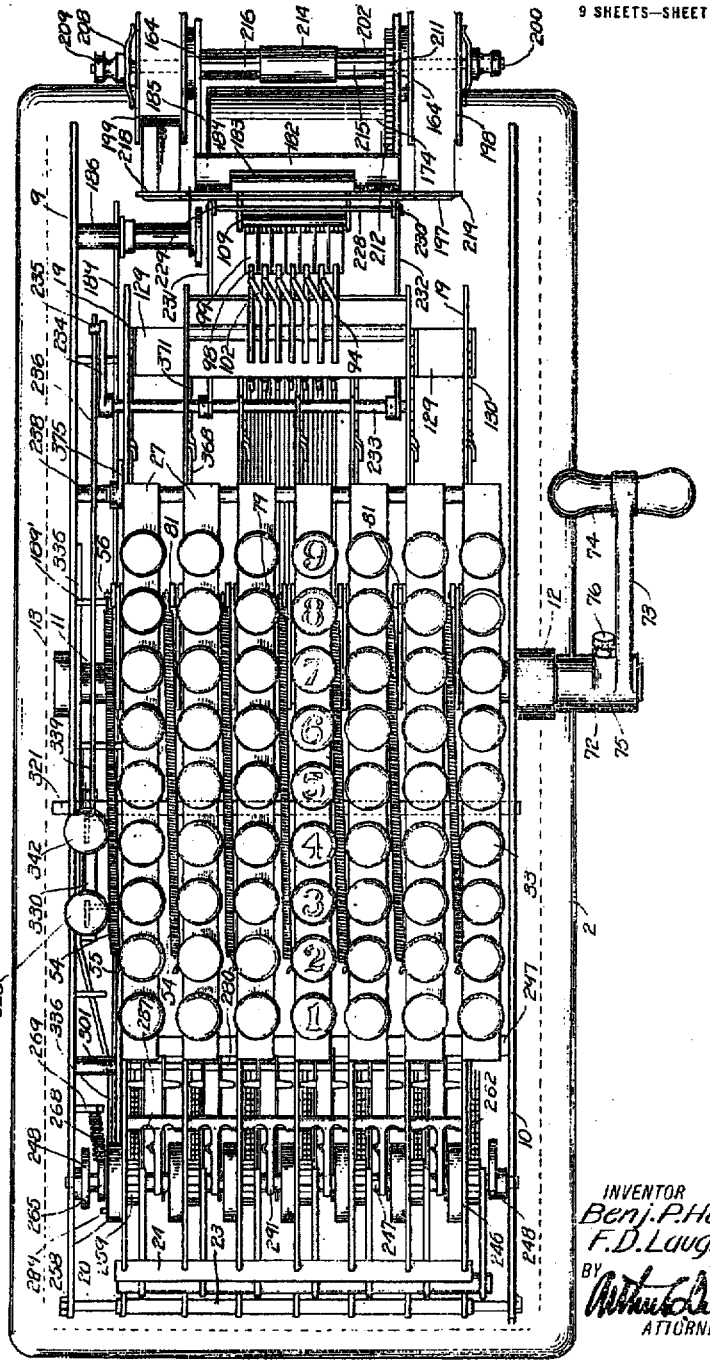
INVENTOR
Benj. P. Hayes.
F. D. Laughlin.
BY
ATTORNEY

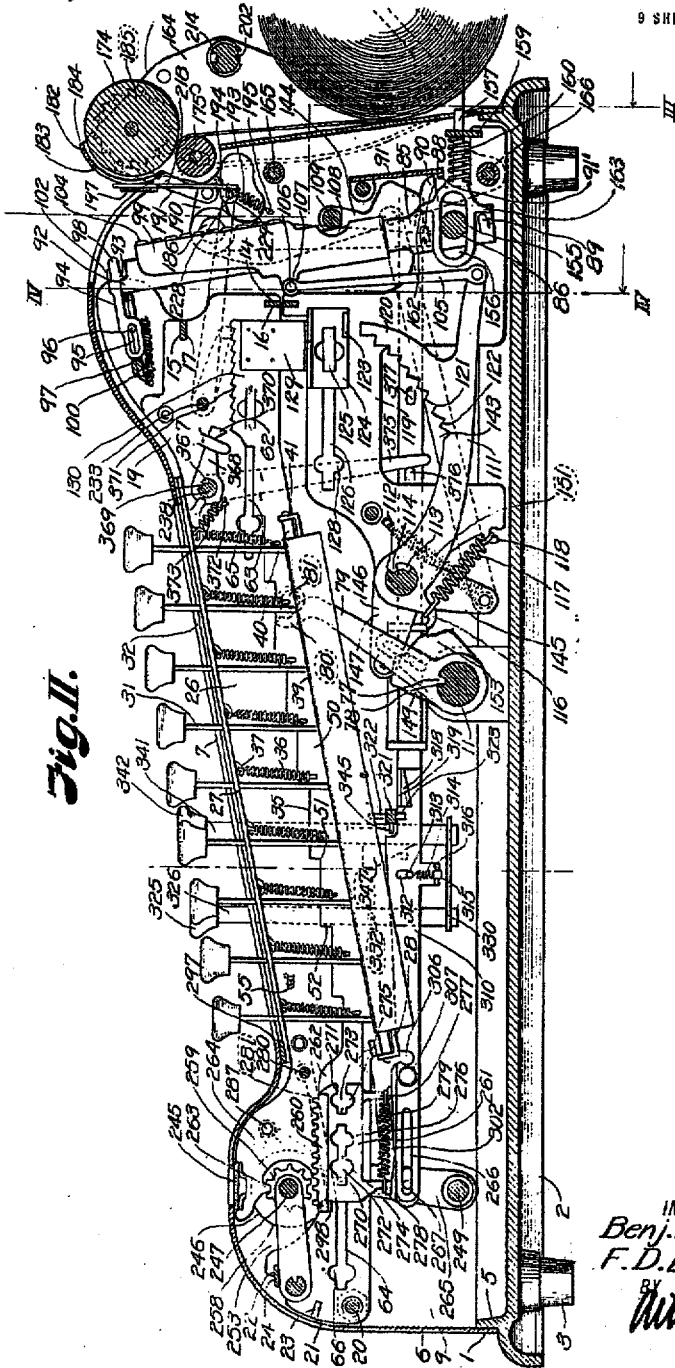

B. P. HAYES & F. D. LAUGHLIN.
ADDING MACHINE.
APPLICATION FILED DEC. 6, 1915.
1,285,156.
Patented Nov. 19, 1918.
9 SHEETS—SHEET 4.
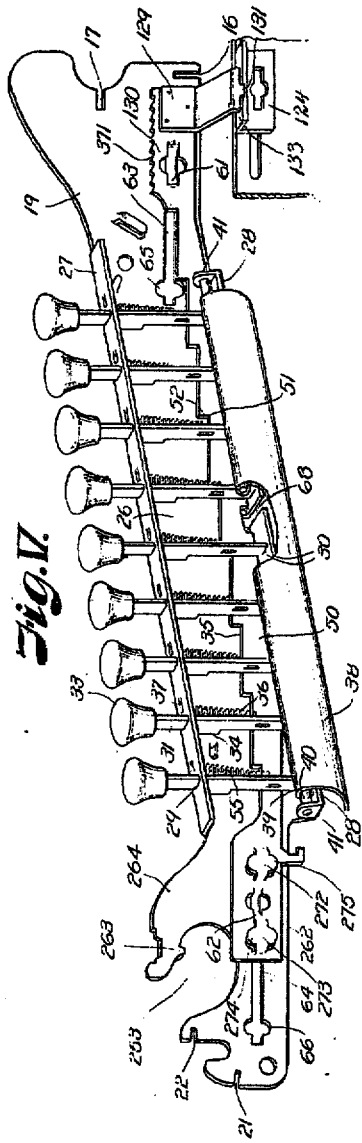
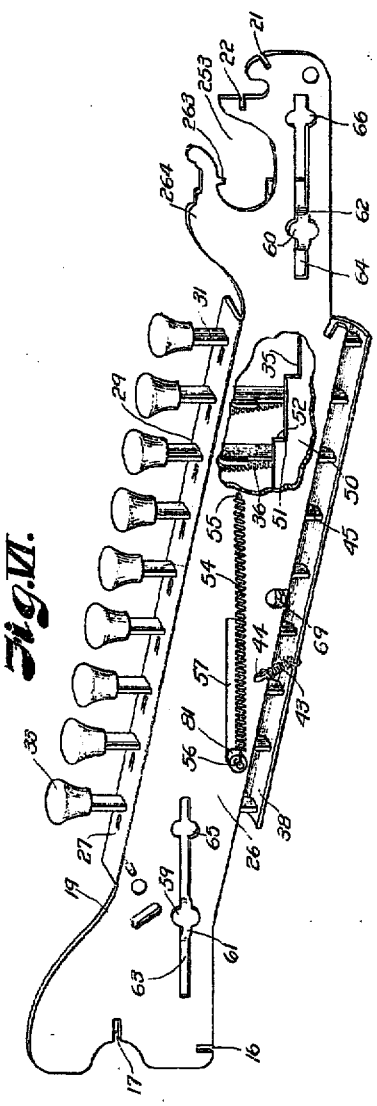
INVENTOR
Benj. P. Hayes
F. D. Laughlin.
BY
ATTORNEY

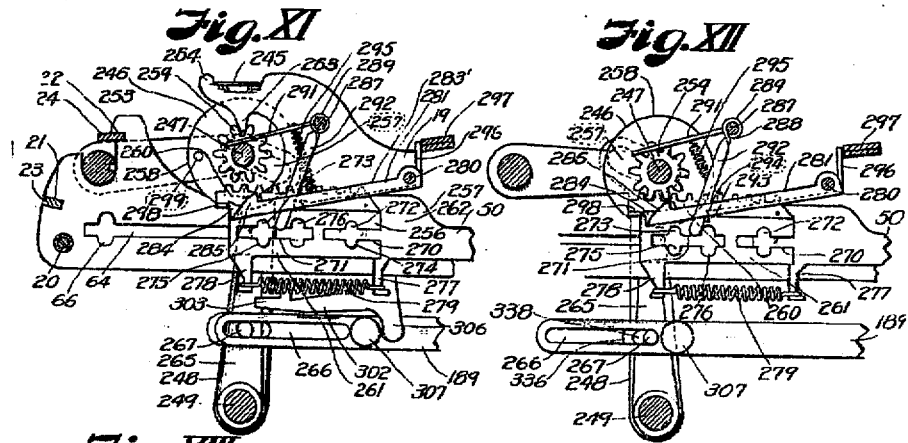
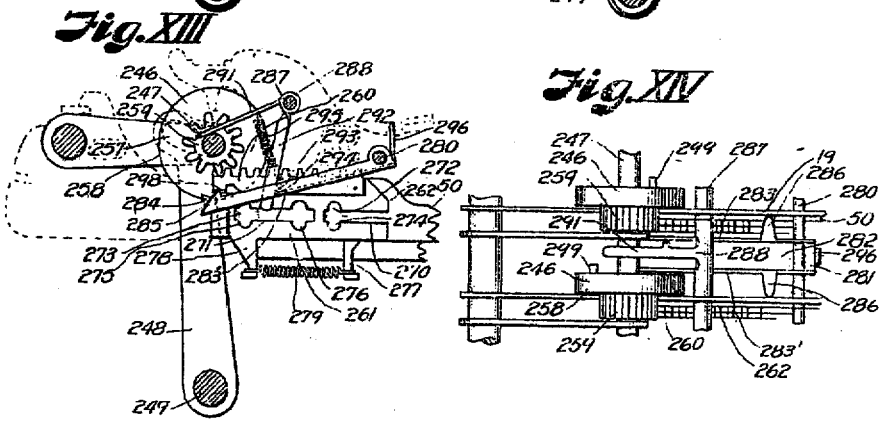
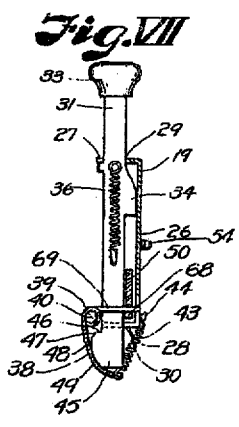
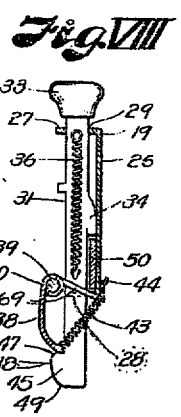
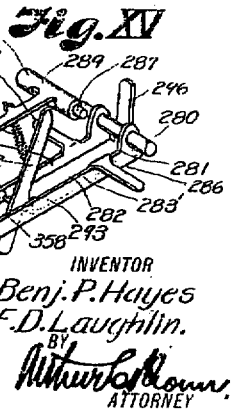

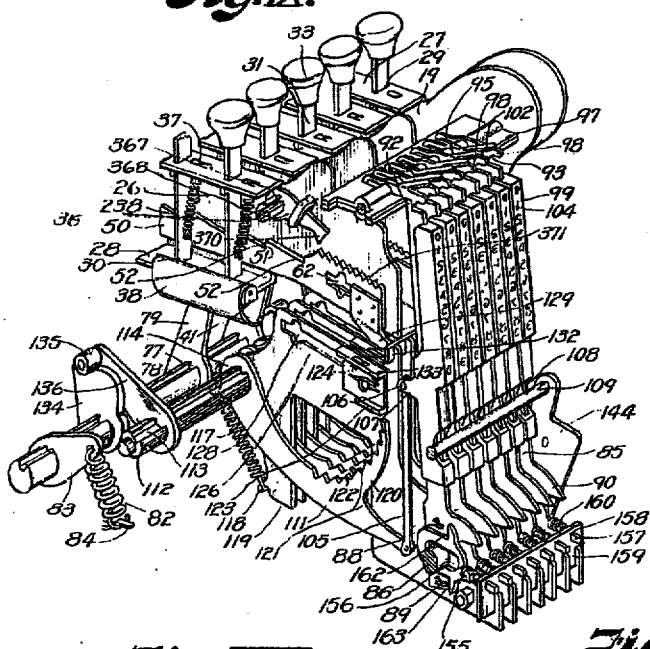
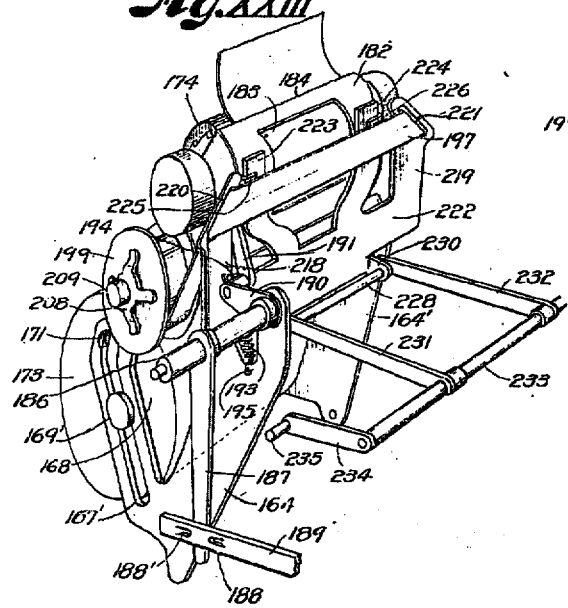
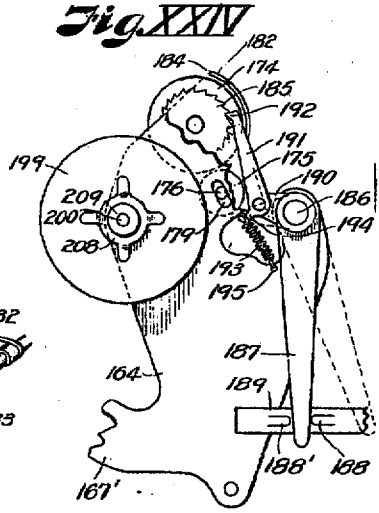

B. P. HAYES & F. D. LAUGHLIN.
ADDING MACHINE.
APPLICATION FILED DEC. 6, 1915.
1,285,156.
Patented Nov. 19, 1918.
9 SHEETS—SHEET 7.
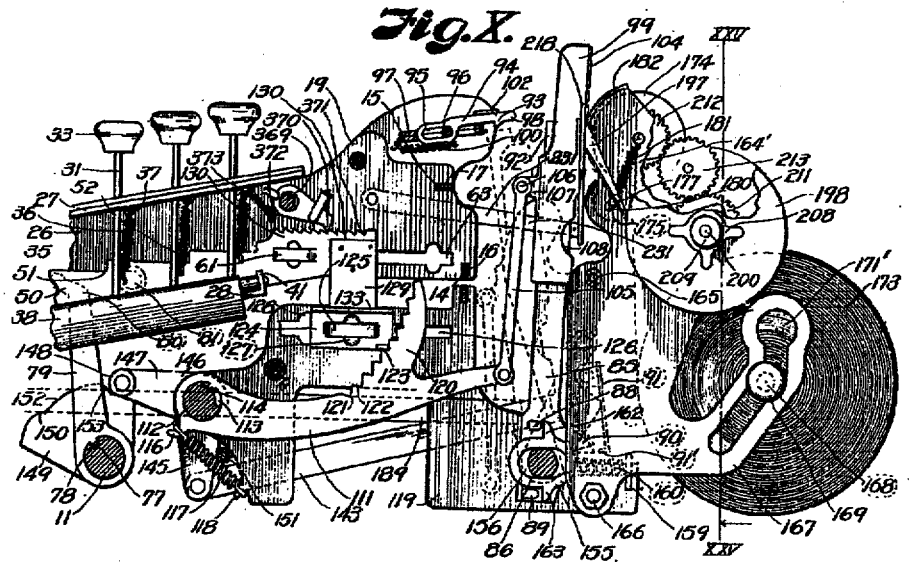
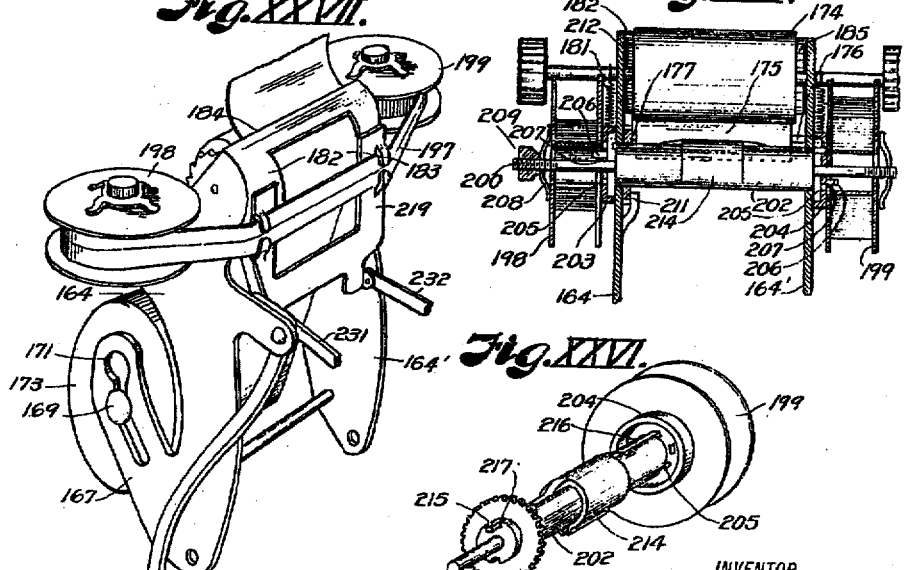
INVENTOR
Benj. P. Hayes.
F. D. Laughlin.
BY
ATTORNEY

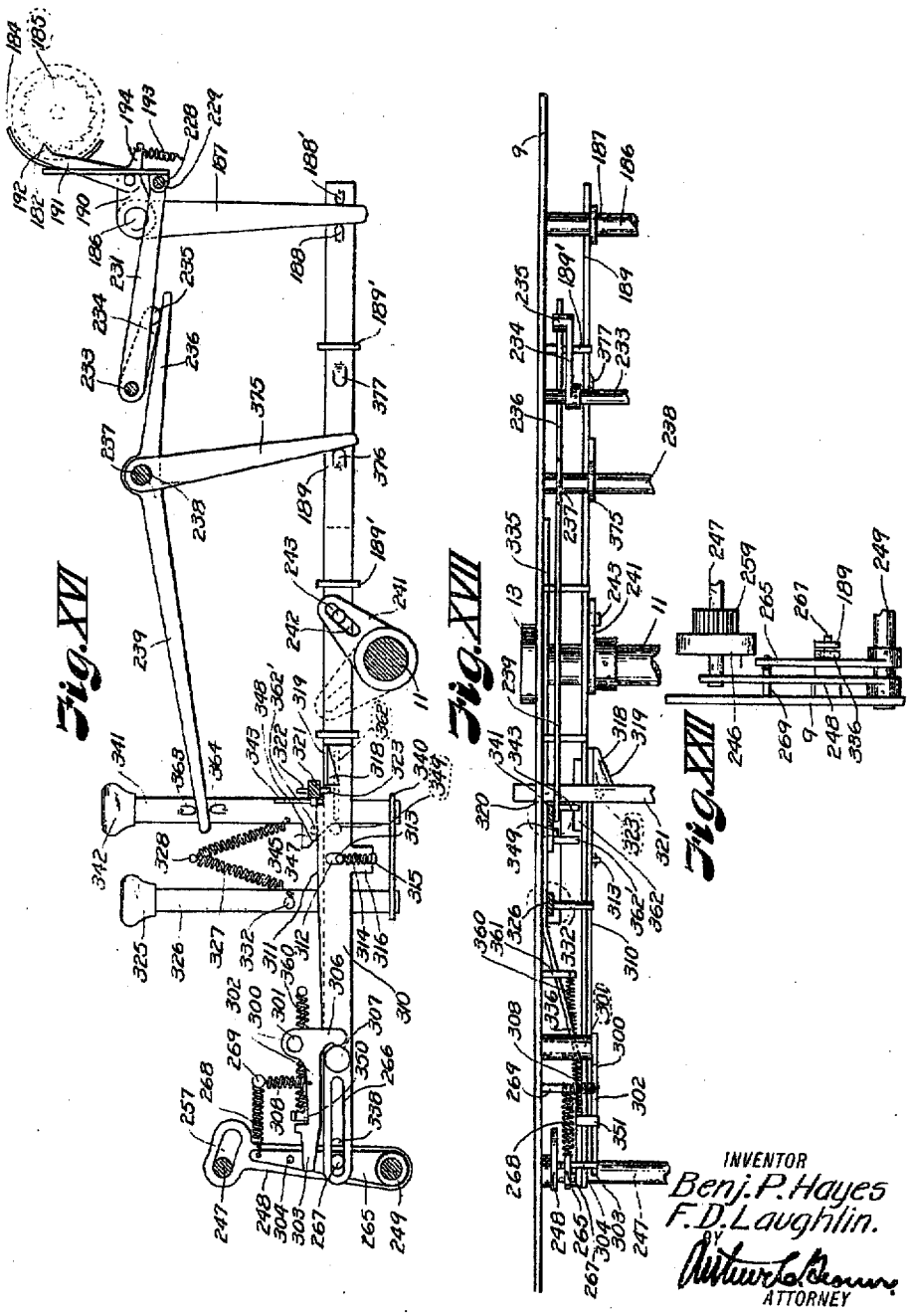

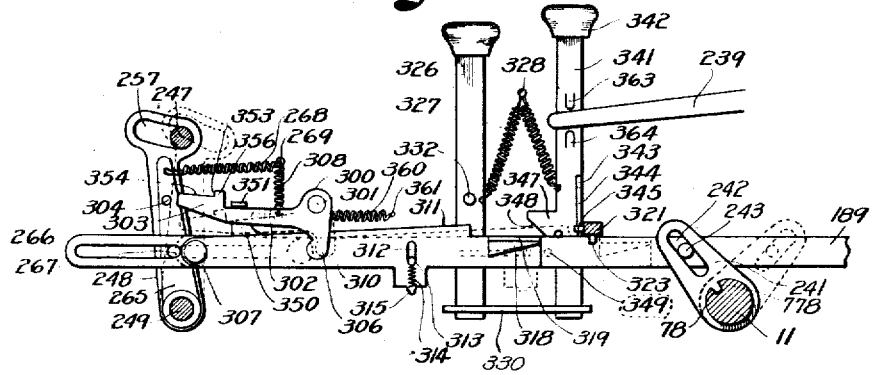
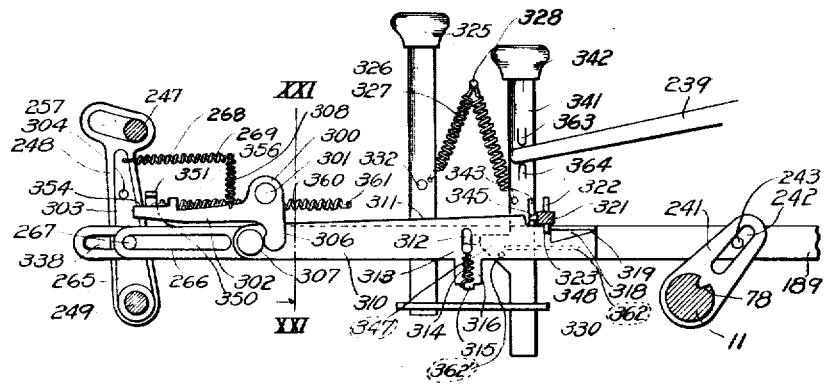
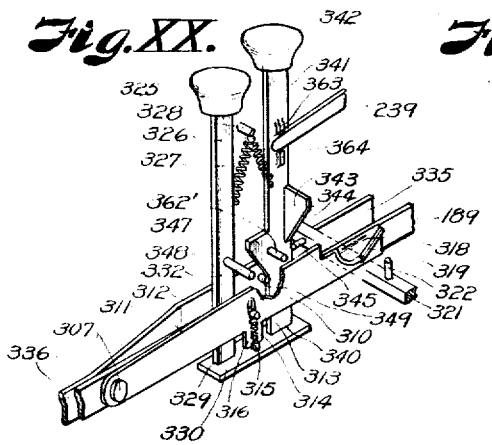
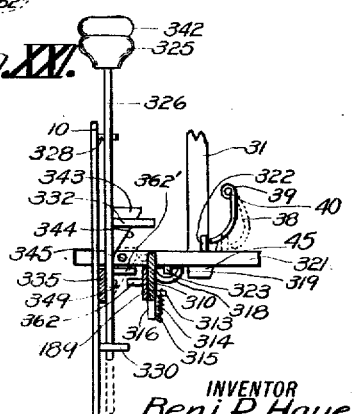

UNITED STATES PATENT OFFICE.

BENJAMIN P. HAYES AND FRANK D. LAUGHLIN, OF KANSAS CITY, MISSOURI, ASSIGNORS, BY DIRECT AND MESNE ASSIGNMENTS, TO AUTOMATIC BOOKKEEPING REGISTER COMPANY, OF KANSAS CITY, MISSOURI, A CORPORATION OF DELAWARE.

ADDING-MACHINE.

1,285,156.   Specification of Letters Patent.   Patented Nov. 19, 1918.

Application filed December 6, 1915. Serial No. 65,334.

*To all whom it may concern:*

Be it known that we, BENJAMIN P. HAYES and FRANK D. LAUGHLIN, citizens of the United States, residing at Kansas City, in the county of Jackson and State of Missouri, have invented certain new and useful Improvements in Adding-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to adding machines, and more particularly to a device of that character wherein figures for separate columns may be selected by means of a keyboard to effect placement of type members corresponding to functionated members of the keyboard, wherein the type members may be actuated to effect printing of individual figures of a column and the column total, and wherein the progressive total of a column is shown on a suitable register that also serves in effecting the printing of the final total.

It is one of the principal objects of the present invention to effect positive placement of type members for the several orders of a column to secure a correct record when the printing is effected, and to positively and accurately actuate the register mechanism whereby slippage or inaccurate placement of the register wheels is obviated.

It is also an object of the invention to repeat any figure in the column without resetting the figure from the keyboard.

It is also an object of the invention to effect automatic return of any of the keyboard parts prior to the functional positioning of another keyboard part in the same column or bank.

It is also an object of the invention to hold the actuating bars after printing of a total to prevent their jumping, and thereby obviate jar and strain on the machine.

It is also an object of the invention to limit the number of parts whereby the several operations of the machine are effected and to form a compact, rigid and smoothly operating device.

Other objects of the invention are disclosed in the following description, and the preferred structure, whereby such objects are accomplished, is illustrated in the accompanying drawings, wherein:—

Figure I is a plan view of an adding machine constructed according to our invention; the top plate being removed to show the interior mechanism.

Fig. II is a longitudinal, vertical section of the machine.

Fig. III is a transverse vertical section on the line III—III, Fig. II.

Fig. IV is a similar view on the line IV—IV, Fig. II.

Fig. V is a detail perspective view of one of the keyboard units, showing a bank of keys and their selecting bar.

Fig. VI is a reverse view of the same.

Fig. VII is a detail side elevation of one of the keyboard keys as it appears when idle.

Fig. VIII is a similar view of the same bar showing the key in functional position.

Fig. IX is a detail perspective view of what I term the printing head of the machine, including the type members, part of their actuating mechanism, and parts of the keyboard mechanism.

Fig. X is a side elevation of the same, but showing part of the printing mechanism in functional position.

Fig. XI is an enlarged side elevation of the registering mechanism, showing one of the register wheels in locked position.

Fig. XII is a similar view, showing the register wheel in driven relation to its corresponding actuating bar of the keyboard mechanism and showing the parts as they appear upon initial contact.

Fig. XIII is a similar view showing the parts as they appear when the rack on the actuating bar starts its engagement with the register wheel gear to print a total.

Fig. XIV is a plan view of the parts shown in Figs. XI to XIII inclusive.

Fig. XV is a detail perspective view of a register wheel transfer mechanism.

Fig. XVI is a side elevation of the total and repeat keys and the register slide bar.

Fig. XVII is a plan view of the same.

Fig. XVIII is a detail side elevation of the register setting mechanism as the parts appear when the register has been thrown down to position for engaging its actuating parts, by means of the main crank handle.

Fig. XIX is a similar view, showing the parts as they appear when the register has been lowered by means of the total key.

Fig. XX is a detail perspective view of the total and repeat keys and their register actuating members.

Fig. XXI is a cross section on the line XXI—XXI, Fig. XIX, showing the total and repeat keys, their register actuating mechanism, and their key post releasing mechanism.

Fig. XXII is a detail view of the cam lever mechanism for actuating the register shaft.

Fig. XXIII is a detail perspective view of the record web mechanism.

Fig. XXIV is a side elevation of the same.

Fig. XXV is a transverse vertical section of the same.

Fig. XXVI is a detail perspective view of the web shaft, with one of the drums removed.

Fig. XXVII is a perspective view of a modified form of web mechanism, showing the inking ribbon run horizontally instead of vertically.

Fig. XXVIII is a detail perspective view illustrating the link connection between the selecting bars and type bar stop slides.

Referring more in detail to the drawings:

1 designates a case within which the operating parts of the machine are contained and which comprises a base 2, having legs 3 whereby it may be supported above a table, or the like, or which may form the legs of a suitable stand.

The base 2 is provided with an upstanding edge flange 5, and supported on the base and retained by said flange is a housing 6 having an inclined top portion 7 and provided with suitable slots hereinafter designated, through which the key posts and other parts may be projected so that access may be had thereto from the exterior of the casing, and through which the register or other contained parts of the machine may be observed.

Located within the housing 6, and seated on the base 2, are side frame plates 9—10 (Figs. III—IV), which are held rigidly and firmly in position by their fit against the base and flange 5 and by the main crank shaft 11 which extends therethrough and is journaled in bosses 12—13 that rise from and are preferably formed integral with said base.

Fixed to and extending transversely between the frame plates 9—10, near the rear of the machine, is a vertically arranged key bar 14 (Fig. II), and a horizontally arranged bar 15, and supported at its rear by said bars, and specifically by slotted portions 16—17, that take over the bars 14 and 15, are key post frames 19, the forward ends of which are supported and positioned by a bolt 20 that is carried by and extends transversely between the frame plates 9—10, and extends through all of the key post frames; the forward ends of said frames being also provided with slotted portions 21—22 that fit over key bars 23—24 that are carried by and extend between the housing plates 9—10 at the front of the machine.

There are as many individual key post frames 19 as there are banks of key posts, or, in other words, a machine adapted for five column figures would comprise five individual key post frames, and a machine for treating seven columns would contain seven of the said frames, but as each frame and its set of parts is identical with each of the others, I will refer to but one in detail, with the understanding that such description relates equally to all.

Referring first to the key posts, as they are the first members to be actuated when the machine is operated, 19 (Figs. V—VIII), designates the carrying plate as a body and which, as before stated, is rigidly located in the machine so that it has no movement itself, although it carries and supports other movable elements; the said plate comprising the inclined body portion 26 and the laterally turned flanges 27 and 28 at its upper and lower edges. The flanges 27—28 have registering slots 29—30 therein which are spaced equally throughout the length of the flanges and are nine in number in order to accommodate the nine key posts 31 that are slidably mounted in said slots and extend through a common longitudinal slot 32 in the inclined top of the housing 6 of the main casing; the said posts carrying buttons 33 at their upper ends and exteriorly of the housing, where they may be accessible to an operator. The buttons 33 bear numerals from one to nine, with the lowest numeral at the bottom or forward end of the machine and the highest numeral "9" at the top, so that the numerals run consecutively from "1" to "9", starting at the bottom or front of the machine.

The posts 31 constitute setting devices for determining the movement of a selecting bar whereby the register wheel for that particular column or key bank is actuated, and whereby stop mechanism for determining the position of the type mechanism for said column is fixed, and each post comprises a stop 34 which consists of a projection from one edge of the post and is adapted for engaging a relative stop 35 on the selecting bar when the post is lowered to functional position.

As movement of the selecting bar does not occur until after a post has been lowered to functional position, means must be provided for holding any post lowered against the tension of a spring 36 which is connected with the post and with a hook 37 that is stamped from the upper frame flange 27 and normally yieldingly retains the post in elevated or normal position and automatically returns the same so that the parts may be held in functional position until the register and printing operations have been completed.

This holding or post latching mechanism comprises a wing 38, consisting of a curved metal plate having a collar 39 formed integrally on its upper edge and fixed to a rod 40, the ends of which are pivotally mounted in ears 41 that stand upwardly from the ends of the lower housing plate flange 28; the width and curvature of the wing being such that its lower, free end is normally projected beneath the lower, free ends of all of the posts 31 when the latter are in normal or inactive position; the wing being held in such position by a spring 43 which is connected with the free edge of the wing and with a hook 44 that is stamped from the body of the frame plate 19. The lower free end of each post 30 comprises a head 45 having a shelf portion 46 projecting from the edge of the post opposite the stop 34 and which is beveled downwardly from the shelf to form an inclined bearing 47 that is adapted for riding over the edge of the wing upon initial upward movement of the post, an interval space section 48 that is adapted for movement over the edge of the wing in a vertical plane to afford vertical movement of the post over the edge of the wing for an interval in which the wing remains stationary, and a curved nose 49 whereby the wing may be displaced upon downward movement of the post, the head 45 being so shaped to effect displacement of the wing upon initial downward movement of a post, so that the lower edge of the wing is moved off of the shelf portion 46 and onto the inclined part 47 of a previously held post and returned by its spring before the interval space part 48 of the succeeding post has reached the edge of the wing, to allow the previously set post time for return before the succeeding post has reached its holding position on the wing and thereby obviate the possibility of two key posts in the same bank becoming locked simultaneously.

It is apparent that with such a structure, if the succeeding post is lowered to its limit it will release the preceding one and will itself lock, but if lowered only to a point wherein the interval space portion has not left its contact with the wing, it will itself return upon removal of pressure from the button and without catching on the wing, so that the release of any set key may be effected by a partial depression of another key of the bank, to clear the bank.

The selecting bar 50, heretofore mentioned, comprises a single piece of sheet metal of rectangular shape which is adapted for travel along the frame plate 19 between the flanges 27 and 28, and is provided at one edge with notches 51, forming forwardly facing and vertically arranged stops 52 which are adapted for contact with the stops 34 on the key posts when the selecting bar is forwarded by the mechanism presently described.

In the present machine, wherein each key bank comprises but nine posts, the posts have nothing to do with actuating the bar but are merely utilized to stop the bar at desired positions; the movement of the bar being effected by a spring 54, one end of which is attached to a hook 55 that is stamped from the frame plate 19 and the other end of which is connected with a pin 56 that is fixed to the selecting bar 50 and projects through a slot 57 in the housing plate, so that when the selecting bar is released by the handle crank, as presently described, the spring will advance the selecting bar until it engages a depressed key post, or until a cipher stop on the bar engages a stop portion on the wing, the crank member just mentioned normally holding all of the selecting bars in the machine at the initial position, but when actuated, freeing all of the bars to the action of their springs, so that all of the bars for the banks wherein no key posts have been depressed, may move to the cipher position and the bars for which key posts have been depressed may be moved until stopped by the key posts.

Each of the bars 50 is held to its housing plate by key heads 59—60 (Fig. VI) that are stamped from the bar and have shank portions 61—62 slidably mounted in slots 63—64 in the housing plate, the slots having enlarged portions 65—66 through which the heads may be projected to seat the shanks in the slots, but which are so located as to obviate accidental displacement of the heads, and the slots being located in parallel, horizontal planes so that while the notched portion of the selecting bar is inclined the travel of the bar is horizontal.

To effect the stop of each selecting bar at the cipher position we provide the bar with a slot 68 (Figs. V and VII) in its under edge, and provide the wing 38 with a tooth 69 which seats in the bar slot when the wing is in normal position but moves out of the bar slot when the wing is lowered by depression of any of the key posts; it being apparent that with this arrangement should the bar be released by the main crank without any key post having been depressed, the selecting bar will move under the tension of its spring until stopped by the wing tooth 69, the movement being sufficient to shift the register mechanism one space, but should any key post in the bank have been depressed it will, upon moving the wing, remove the wing tooth, so that the bar is free to move until stopped by the depressed key post.

It is apparent that in order that the bar may move to the determined position for locating a particular character on the type bar and registering wheel in functional positions, there must be an increment movement of the bar relative to the type member posts. This increment is provided for by spacing the posts an equal distance apart and constructing the stops on the selecting bar of the same length, but of a length slightly in excess of the spacing between the individual posts. With this arrangement, supposing the posts to be spaced seven-eighths of an inch apart, and the stops to be one inch in lengh, it is apparent that if the first stop on the selecting bar is normally a quarter of an inch back of the first post; the second stop will be three-eighths of an inch back of the second post, and that a like progression is present throughout the length of the bar. When the type bar and registering wheel are so arranged that one-eighth of an inch of movement will throw the bar and wheel from one position to the next, it is apparent that the increment in the selecting bar is sufficient to properly space the bar and wheel for a character represented by a like character on a relative key member; the inclined stepped arrangement of the bar and key post stops providing that should it be necessary for one of the rear bar stops to pass beneath an inactive key post stop to reach its active post stop, the inactive key stop, beneath which the active bar must travel, will not interfere with such travel.

It is also apparent that as each selecting bar has the initial cipher movement independently of the key post setting, and as the progressive movements of each bar must have an increment proportionate to the space between the type members, the first key post must be spaced from its selecting bar stop a distance equal to twice the distance of movement to the cipher stop, so that when the first key post is lowered the bar carries the printing mechanism past the cipher position and until the figure 1 is in printing position. As the figures on the type members and register wheels are spaced equally, the selecting bars must move a relatively greater distance for each higher number, or for a constant increment having the cipher movement as a base.

Referring now to the crank mechanism whereby the movement of all of the selecting bars is controlled, 11 (Figs. II, III and IV) designates a shaft which is rotatably mounted in the side frame plates 9—10 and in the bearing lugs 12—13, and has one end projected from the side of the housing. Fixed to the projecting end of the shaft is the hub 72 of a crank arm 73 having a handle 74, the said hub being provided with a boss 75 through which a set screw 76 is projected to engage the shaft 11 to hold the crank removably to the shaft.

Fixed on the shaft 11, by means of tongues 77 (Fig. II) that project into a longitudinal groove 78 in the shaft, are arms 79, one for each of the selecting bars, and having hooked ends 80 adapted for seating against the rollers 81 (Fig. VI) on the pins 56 that carry the actuating springs 54 whereby the selecting bars are moved forwardly when released by the crank mechanism, the shaft 11 being held yieldingly at its rearward position and all of the arms being yieldingly held rearwardly against the selecting bar rollers to normally locate the selecting bars at their rearward positions, by a spring 82, which is fixed to one end of an arm 83 that is attached to the shaft by the tongue and groove combination heretofore described, and the opposite end of the spring being fixed to a hook 84 on the base of the casing, so that when the crank handle is moved forwardly, all of the arms 79 move forwardly therewith to allow the selecting bars to move forwardly under tension of their springs and until the said bars are stopped by the cipher stops or key posts.

While we have designated the bars 50 as selecting bars, it is not through these bars that the actuation of the printing mechanism takes place, as the only direct actuation accomplished through the bars 50 is that of the register. The bars 50, do however, fix the movement of the individual type members, and as the positioning of the type mechanism is the first phase of movement after the selecting bars have shifted, we will describe the printing mechanism as the next step.

As the bars 50 must be spaced sufficiently to accommodate the latch mechanism and other parts of each bank of key posts, considerable distance must be left between the bars, but as it is desirable to concentrate the type members in order to limit the width of the column of printed figures, we centralize the type members at the rear of the machine in order to provide the compact arrangement that is desired. As each type member set is identical in construction and operation, with each of the others, we will mention but one in detail, with the understanding that such description refers equally to all.

Each type set comprises a bar 85 which is pivotally mounted on a shaft 86 that is carried on the frame plates 9—10, and has ears 88—89 extending laterally from one face thereof at diametrically opposite sides of the shaft 86, so that when the bar is inclined backwardly—which is its normal position— the upper ear 88 will lie back of the lower bar 89. The lower end of said bar is provided with a hook 90 that extends from its forward end and is adapted for engagement with the forwardly directed lips 91' of latch plate 91, presently described in detail. The upper end of the bar 85 has a tip 92 that is normally engaged by a hook 93 on a latch member 94 to hold the bar in forward inclined position, the forward portion of said latch having a slot 95 through which a pin 96 on a latch frame 97 is projected, to slidably mount the latch on the pin, the said body being extended rearwardly of the bar tip 92 in order to form an abutment 98 for engagement by the type carriage 99 when the latter is elevated, to move the latch out of engagement with the pivoted bar and permit rearward movement of the bar.

The latch bar 93 is adapted for limited rearward movement because of the pin and slot mounting, but is yieldingly held to its forward position by the spring 100 that is connected with the latch and with the frame 97 upon which the latch is mounted, so that the latch bar is normally at the forward limit of its movement, the pivoted bar being held backwardly under normal conditions by a stop mechanism, presently described, and being held in intermediate position by the latch 94, particularly illustrated in Fig. XI. Each of the latches 94 is also provided with a laterally directed arm 102 which lies over the latch 94 for the column directly to its left, so that when a latch in any column or bank is lifted the arm 102 of the latch of the next column to the right is also lifted in order to release all of the pivoted bars to the right of any selected column.

Although we have referred to the bar 85 as comprised in the printing mechanism, the type members themselves are not carried on the bar 85, but are mounted on the forward edge of the carriage 99 that is movable over said bar and has the type characters 104 on its forward face. The carriage 99 is substantially rectangular in cross section to fit snugly over the bar 85, while permitting free sliding movement of the carriage on the bar, and is pivotally mounted at about its longitudinal center, at the rear, on the upper end of a pitman 105 by means of a pin 106 that is carried by the rearwardly projecting ears 107 on said carriage, the carriage being cut away at its rear edge above the pivotal point in order that the front of the carriage may have sufficient thickness to form a solid body for striking the type against the platen and without increasing the width of the carriage in order to accommodate the bar 85, and the front edge of the carriage being cut away below the pivotal point to form the recesses 108, through which a latch bar 109 may engage the front edges of the bar 85 to replace the bar 85 without interfering with the carriage, as will presently be described.

The pitman 105 is pivotally connected at its lower end with a stop arm 111 that is pivotally mounted on a shaft 112 that is rotatably mounted in the frame members and has a longitudinal groove 113 therein into which a tooth 114 of the hub portion of the stop arm is projected, the groove being of greater width than the tooth 114, so that the shaft or tooth may have movement independent of each other, the shaft being normally held in a fixed position by mechanism presently described, and the stop arm having a hook end 116 for carrying a spring 117 that is anchored on the hook 118 on the stationary frame 119, that carries a stop slide presently described, there being an individual frame 119 for each bank or selecting bar in the machine, and all of the frames being concentrated at the center of the machine to coöperate with the concentrated printing mechanism, so that the arm 111 is yieldingly urged upwardly but is held in initial position by engagement of the tooth 114 with the rear edge of the groove 113.

The arm 111 is provided with a neck 120, having a plurality of notches 121 in its front face, forming the stops 122, that are adapted for selective engagement with a stop lip 123 on a slide 124 that is mounted on the plate 119, the said slide preferably comprising a piece of sheet metal, having a stamped-out shank 125 that projects slidably into a horizontal slot 126 in the plate 119, and has ears 127 that engage the side of the plate opposite the slide, in order that the said slide may move along the plate but be held in close relation thereto, the slide being originally applied to the plate by projecting the ears through the recesses 128 in the said plate, in order to position the slide with the body and ears on opposite sides of the plate.

The notches 121 in the rear face of the neck 120 of the stop arm 111 are so arranged that the stops 122 are spaced equally to the spacing of the type members 104 on the front face of the carriage 99, so that when any of the stops engages the ear 123, a corresponding type member on the front of the carriage will be in printing position. The positioning of the slide 124 to effect the positioning of the type member is effected by the relative selecting bar 50, heretofore described, by providing the said bar with a link 129 (Fig. IX) comprising a metal strap that is fixed to the rear head 130 of said selecting bar and is extended laterally toward the center of the machine and to a point directly above the relative frame member 119, where the free end of the link is turned downwardly and provided with a tip 131 (Fig. V) that extends into a slot 132 (Fig. IX) in the flange 133, on the top of the slide 124, so that when the selecting bar is moved forwardly under tension of its spring, the link 129 is carried forwardly therewith and moves the slide 124 along its carrying frame to such position that when the stop arm is raised, the proper stop 121 will engage the ear 123 to limit the upward movement of the arm and the type carriage, so that when the carriage is shot forwardly the proper type character will be printed on the web.

In order to delay the movement of the stop arm 111 until the selecting bar has advanced to its determined position, and thereby insure proper engagement of the stop arm with the slide ear, we control the movement of the stop arm by a cam 134 that is fixed on the crank shaft 11 and engages the roller 135 on the arm 136 that is fixed on the shaft 112, so that as the crank shaft is revolved to move the arm 79 out of the path of the roller on the selecting bar, the spring 117 on the stop arm 111 will revolve the shaft 112 so that as the cam 134 moves out of the way of the roller, the roller follows to allow the shaft 112 to be revolved under tension of said spring and permit the stop arm 111 to turn on its pivotal mounting on the shaft 112 and lift the stop arm into proper engagement with the slide ear and thereby position the type carriage so that when the printing operation takes place the proper character will be printed, it being apparent that as the shaft 112 revolves the rear edge of the groove 113 will move away from the tooth 114 so that the tooth may follow to permit the stop member to rise.

As the crank handle is operable from the crank member that is located exteriorly of the machine, it is apparent that the crank might be operated accidentally, or by some unauthorized person to effect the printing when such is not desired, or at a time when confusion might result therefrom, and it is to obviate this that we have provided the double latch mechanism 91 and 93 for the printing members.

As before stated, each of the selecting bars 50 has a limited initial movement to carry all of the bars to position, upon actuation of the crank handle irrespective of the positioning of the key post, so that the bars have this movement for any movement of the crank handle. This movement of the bar is not sufficient, however, to carry the slide ear 123 past the position for engagement with the end of the stop arm neck 120, so that when the crank is moved without any key post being depressed, the ends of the neck will contact the ears 123 and limit the upward movement of the type carriage 99 to a point short of engagement of the end of the carriage with the latch tip 98, so that the latch 94 is not moved out of contact with the pivoted bar 85 and is not released to effect the printing operation.

When, however, one of the key posts has been depressed, so that the latch wing is moved to release the cipher stop that would hold the selecting bar, the slide 124 is moved forwardly on the frame plate 119, so that one of the notches, for a number from 1 to 9, engages the stop ear when the crank is moved, with the result that the type carriage is moved upwardly along the bar 85 sufficiently to unseat the latch 93 so that the pivoted bar has pivotal movement on the shaft 86, this pivotal movement throwing the tooth 90 down against the latch lip 91' of the latch member 91, so that the pivoted type mechanism is held in the second latch position until the time for printing, when the latch 91 is moved on its pivotal mounting on the rod 141 to move said member out of latching position and release the type member. This movement of the latch member 91 is effected by a link 143 which is pivoted on a hanger 144 that in turn is pivoted on the shaft 86 and has a nose adapted for engaging the latch member 91 to move the latter out of its holding position with the latch bar tooth.

The link 143 is pivotally connected with the lower arm 145 of a bell crank lever 146 (Fig. X), that is pivotally mounted on the shaft 112 and has an arm 147 provided with a roller 148, which engages a stepoff cam 149, that is fixed on the crank shaft 11. With this arrangement, with the crank shaft 11 on its rotary movement, the roller 148 moves over the first stepoff 150 of the cam, as the crank shaft starts its movement, so that the spring 151 that is connected with the arm 145 throws the bell crank lever about a limited distance, to move the frame 144 back to remove the rod 109 from its engagement with the type bars 85 so that said rod will not interfere with the vertical movement of the type carriage along the pivoted bar, this relief of the pivoted bar permitting a limited rearward movement of the bar for the reason that the latch spring 100 is not as strong as the spring that actuates the printing mechanism, as will presently be described.

The roller 148 then rides along the concentric base 152 of the cam and the latch 144 remains idle, but as the crank handle reaches the forward limit of its stroke the roller 148 moves over the second stepoff 153 so that the bell crank lever is given a second or final movement. This final movement throws the latch 144 back sufficiently to effect engagement of the latch 144 with the latch member 91, so that the latter is moved rearwardly and releases the tooth 90 of the pivoted bar, so that the latter is free to move to printing position, the type carriage having meanwhile tripped the latch 93 to release the bar.

While the parts heretofore mentioned effect movement of the pivoted bar and type carriage, independent mechanism is provided for effecting the actual printing stroke. This mechanism comprises a head 155 having an oval slot 156 through which the shaft 86, that carries the several bars 85, is projected and having a shank 157 that is slidably mounted in a slot 158 in a rail 159 that is carried at the rear of the machine, a coil spring 160 surrounding the shank and bearing against the rail 157 and against the rear end of the head 155, to yieldingly urge the head forwardly. The head 155 has ears 162—163 at the top and bottom respectively that are adapted for engaging the ears 88—89 on the lower end of the pivoted bar. When the pivoted bar is in normal position the lower ears 89—163 are in engagement and the upper bar ear 88 is spaced forwardly from the upper head ear 162, it being apparent that as the type bar is held by the upper or lower latches, the tension of the spring 160 will merely force the head against the lower lug and maintain such position until the pivoted bar has been released. When the pivoted bar has been released by the latch mechanism, the tension of the spring 160 throws the bar around on its pivotal mounting and shoots the carriage 99 rearwardly so that a proper type character on the carriage strikes the inked ribbon against the platen to effect printing on the record web, the impetus of the bar, under tension of the spring, carrying the bar rearwardly so that the spring reacts upon impact of the lug 89 with the lug 162, with the result that as the bar assumes an equilibrium with both of the bar ears in contact with both of the head ears, the type on the carriage 99 will be spaced from the inked ribbon, so as not to interfere therewith.

As the crank handle is moved backwardly after the printing operation has been effected, the roller 148 rides up the stepoff 153 of the cam 149 so that the initial movement of the cam draws the hanger latch 144 forwardly to induce engagement of the rod 109 with the rear edges of the pivoted bars 85, thereby forcing the bars forwardly so that the teeth 90 rock the latch member 91 to enable the teeth to assume the latching relation therewith, the final movement of the crank carrying the first stepoff cam 149 beneath the roller 148 to effect the final movement of the pivoted bar against the tension of the head spring 160 and effect the latching coöperation of the pivoted bar with the upper latch 94 to retain the printing mechanism to its fullest initial position.

The record web forwarding mechanism which we prefer to use with the machine comprises plates 164—164' (Figs. X-XXIII-XXVII), which are mounted on rods 165—166 that are carried by the side plates 9—10 of the interior frame and have rearwardly extending slotted arms 167—167' that are inclined upwardly and rearwardly so that a rod 168 may slide in the slots to automatically move toward the base ends thereof, said rod having end heads 169 that are adapted for projection through enlarged openings 171—171' in the upper ends of the arms to seat the rod in the slot and which hold the rod in place by bearing against the outer faces of the arms. Mounted on the rod 168 is a web roll 173, the free end of which is extended upwardly between the platen 174 and a tension roller 175 having stub shafts 176—177 at the ends that are slidably mounted in slots 179—180 in the plates 164—164', the roller being yieldingly tensioned toward the platen by springs 181 that are connected with the stub shafts and with hooks 182 on the front plates 164—164' so that the roller 175 will press the web against the surface of the platen and insure a constant even contact of the web against the platen.

The web 173 is also extended between the platen and a tension plate 182 which is preferably formed integral with the plates 164—164' and extends therebetween, being curved to the contour of the platen and located closely adjacent thereto in order to hold the web firmly in place at the printing position, the tension plate having a cutout portion 183 at the printing position and having a saw edge 184 at its upper end against which the web may be drawn to sever a printed portion from the part held on the platen.

As a fresh unprinted section of the web must be presented to the printing position for each printing operation, we provide for automatically advancing the web at each printing operation by rotatably mounting the platen in the side frame plates 164—164' and operatively connecting said platen with the crank shaft, whereby the platen and web are advanced at each operative movement of the crank handle, preferably through the following mechanism:

Fixed on the platen shaft 174, which is rotatably mounted in the frame plates 164—164', is a ratchet wheel 185 (Fig. XVI), and rotatably mounted on an axle 186 that is carried by the plates 164' and the plate 9, is an arm 187, the lower end of which is projected between lugs 188—188' that are stamped from the body of a shift bar 189 which is operable from the crank shaft, so that each time the shaft is rotated by the crank handle the arm 187 will be swung forwardly and back.

Also fixed on the shaft 186 is a short arm 190 which is adapted to rock vertically when the shaft is rotated by the shift bar, and pivotally mounted on said arm 190 is a pawl 191 having a tooth 192 that is yieldingly held in engagement with the ratchet wheel 185 by a spring 193 that is connected with an arm 194 on the pawl and into an aperture 195 in frame plate 164', the pawl tooth being so shaped and arranged that it will yield upon downward movement to pass over the ratchet teeth, but will hold against upward movement to forward the ratchet wheel and platen.

An inked ribbon 197, whereby the printing is effected, is carried on the reels 198—199 that are rotatably mounted on a shaft 200, having an enlarged portion 202 that is rotatably mounted in the plates 164—164'.

Also rotatably mounted on the end portions of said shaft 200 are cups 203—204 (Fig. XXV) having their flanged portions directed toward the frame and each having a plurality of apertures 205 therein and having a pin 206 projecting outwardly therefrom to engage in an aperture 207 in the inner face of the reel, to lock the reel and cup together. The reels are held inwardly against the cups by springs 208 that are carried on the ends of the shaft, and threaded onto said shaft are nuts 209 whereby the springs are tensioned to clamp the reels in place and hold the cups against the frame plates to form a friction brake that will prevent a too free movement of the reels when they are disconnected from the driving shaft.

The shaft 200 is operatively connected with the platen shaft 176 by gear wheels 211—212 on the shaft 200 and platen shaft respectively, and an idle gear 213, so that when the platen is revolved by the pawl and ratchet mechanism just described, the ribbon shaft 200 will be revolved therewith, to effect advance of the inked ribbon across the face of the platen, so that fresh portions of the ribbon are presented to the type members at successive printing operations. The ribbon shaft 200 may be operatively connected with either of the ribbon reels so that the connected reel may be driven independently of the other, by a key comprising a clip 214 (Fig. XXVII) that is slidably mounted on the shaft 200, and has shanks 215—216 slidably mounted in a groove 217 in said shaft and projected through the frame plates 164—164' and projectable into any of the sockets 205 in either of the cups 203 or 204; it being apparent that if the shank 216 is seated in a socket 205 in the cup 204, as illustrated in Fig. XXV, the reel 199 will be rotated upon rotation of the ribbon shaft when the platen is advanced, and that the inked ribbon will be wound on the reel 199 and drawn off of the freely revoluble reel 198, but that when the ribbon is to be reversed the clip 214 may be moved along the shaft to release the reel 199 and lock the reel 198, to revolve the reel 198 while the reel 199 turns freely.

The inked ribbon is guided across the face of the platen by arms 218—219, having slots 220—221 therein, the said arms being preferably integral with a shifting plate 222, having guide arms 223—224 that slide back of guide flanges 225—226 that are carried by the frame plates 164—164'; the shifting frame being movable vertically in order to shift the inked ribbon, so that when a ribbon having different colored sections is used, the column figures may be printed on the web in one color and the total printed in a different color. The shifting of the frame 222 is effected by mounting said frame on a rod 228 by means of the ears 229—230 at the bottom of the plate; the said rod 228 being carried by arms 231—232 that are in turn fixed on a shaft 233 that is rotatably mounted in the frame plates 9—10.

Fixed on the shaft 223 is a crank arm 234, having a lateral projection 235 that is adapted for engagement from beneath by the arm 236 (Fig. XVI) of a lever 237 that is rotatably mounted on a shaft 238 that is carried by the side frame plates 9—10, the second arm 239 of said lever being operatively connected with the total key hereinafter described, so that when the total key is depressed the lever 237 is rocked to lift the shift plate 222 and thereby effect the printing of the total in red below the column figures.

In Fig. XXIII we have illustrated a web forwarding mechanism wherein the inking ribbon reels are arranged vertically, and in Fig. XXVII have illustrated a modified form wherein the reels are arranged horizontally, with slight modifications of structural detail, the principal features of the mechanism and connection of the parts with the main machine being similar to those in the form comprising the horizontal reels.

The shift bar 189 is, as before stated, adapted for actuation upon each actuation of the main crank shaft, and this actuation is preferably effected by a crank arm 241, (Fig. XVI) that is fixed on the crank shaft and provided with a slot 242 through which a pin 243 on the shift bar is projected, so that when the crank shaft is rotated toward the front of the machine the slotted arm is moved over the shift bar pin to move the bar rearwardly and effect the backward movement of the platen pawl, and when the bar is moved backwardly, upon return of the crank shaft, the pawl is lifted to advance the platen.

In order to effect addition of the figures in a column as the figures are entered, and to effect final printing of the column total, we provide a register that is operative upon each printing movement of the crank handle and is constantly visible to the operator. This register comprises an independently operable wheel for each of the columns or key banks, and which are visible through a window 245 in the upper front portion of the housing 6, the several wheels 246 being mounted on a common shaft 247 that is mounted in arms 248 which are rigidly attached to a shaft 249 that is journaled in the side frame plates 9 and 10, so that the arms may be rocked to raise and lower all of the wheels simultaneously while permitting independent operation of the wheels. The shaft 247 extends through pockets 253 in the forward ends of the selecting bar housing plates 19, and is slidably seated at its ends in downwardly and rearwardly inclined slots 257 in the upper ends of said standard arms 248, so that when the arms are moved forwardly the register wheel shaft will be drawn downwardly and when the arms are moved back the said shaft will be elevated, this movement of the register wheel shaft being provided in order that the register wheels may be locked from the upper portion of the housing frame head when in normal position, but may be moved downwardly into coöperative relation with the selecting bars when in lowered position.

Each of the individual register wheels 246 comprises a disk 258 having characters from 0 to 9 arranged at equally spaced intervals upon its periphery and adapted for observation through the window 245 in the top of the housing, and a pinion 259 that is fixed to the disk 258 at one side thereof, and is adapted for meshing with a rack 260 that is arranged on the upper edge of a plate 261 that is slidably mounted on the forward head 262 of a relative selecting bar. The pinion 259 is also adapted for locking engagement with a tooth 263 that projects downwardly from the upper arm 264 of the housing plate head, the space between the rack 260 and tooth 263 being less than the width of the pinion 259, so that when the register wheel pinion moves from one point of engagement to the other it will mesh with the rack before it leaves its locking engagement with the tooth, or vice versa, and thereby obviate any possibility of slippage between the contact points, and insuring accurate, definite registration.

As the registering mechanism does not operate until the crank handle is returned after a forward movement of the handle, for initial registration, the individual wheels are not affected by the primary forward movement of the selecting bars when the latter are released by the crank arms, but are thrown into mesh with the racks on the selecting bars after the bars have reached their forward limit and as the handle assumes its farthest forward position, so that when the selecting bars are returned to initial position they rotate the register wheels to turn the proper numerals to alinement beneath the window in the top of the housing.

The mechanism for throwing the register wheels into mesh with the selecting bars comprises the shift bar 189, which is arranged along the side of an arm 265 that is fixed to the shaft 249, the shift bar having a slot 266 therein, through which a pin 267 on the arm 265 is slidably projected, the length of the slot being such that the pin will not be positively engaged by the shift bar until the latter closely approaches the rearward limit of its travel. With this arrangement when the crank handle is moved forwardly and the selecting bars have been relieved and are moved forwardly under tension of their springs, and it is desired to print the figure on the record web, the crank handle is moved forwardly to effect the printing operation and as the handle approaches the forward limit of its travel the arms 248 are moved backwardly by the pin and slot arrangement just described, and the shaft 247 that carries the register wheels is lowered because of its inclined slot mounting in the post arms, so that the pinions 259 on the several register wheels are moved out of locking engagement with the teeth 263 on the heads of the selecting bar frames, and into mesh with the racks on the sliding plates 261 that are attached to the relative selecting bars, so that when the selecting bars are returned to normal position the racks are carried therewith and, being in mesh with the pinions that are fixed to the relative register wheels, turn said wheels to bring the numerals corresponding to those printed on the record web beneath the window in the top of the housing, it being apparent that if a selecting bar has a long forward movement because of its setting for a large number, the return movement will be equally long and that the register wheel will be rotated a relatively greater portion of its circumferential length to carry the register wheel about until such relatively high number is beneath the window.

As the crank handle is moved backwardly the shift bar returns to its normal position and the spring 268 that is connected with the post arm 265 and a pin 269 on the frame plate 9, returns the post arms to their initial position and moves the register wheel shaft upwardly so that the pinions on the register disks again mesh with their relative locking teeth 263, to hold the disk in position. In the same manner when another figure has been set up and is printed, the return movement of the selecting bars again operates the register wheels so that they are carried farther around and add the last figure to the previous total, so that the column of figures is totaled progressively on the register as the figures are entered on the record web.

Means must be provided for carrying over to successively higher columns in the register mechanism as the totaling progresses, and it is for this purpose that we mount the rack plates 261 slidably on the selecting bars, and provide for movement of the plates on slides that are sufficient to carry the register disks about to advance the wheels one space. The mounting of each plate 261 on its selecting bar preferably comprises slots 270—271 in the slide member and heads 272—273 on the selecting bar, each head having the wings 274—275 that are adapted for movement over the side of the slide to hold the slide to the selecting bar, the slot 270 having the recess 276 through which the wings 274 may be projected to seat the slide on the selecting bar and the slot 271 being open at one end so that the slide member may be moved longitudinally beneath the head wing when the head 272 has been projected through the recessed portion of the slot 270.

The selecting bar 50 has a depending hook 277 and the slide member a depending hook 278, and said hooks are connected by a spring 279 which yieldingly retains the slide at the forward limit of its travel, but permits extension of the slide under the following conditions:

Pivotally mounted on a shaft 280 (Figs. XI–XV), that is carried by the housing frame members 19 and extends transversely across the machine, and located between the adjacent frame members, are brackets 281 each having a body portion extended forwardly between the adjacent selecting bars and provided with side arms 283—283' which extend forwardly beyond the end of the body portion of the bracket and have stop and hook members 284—285 at their respective forward free ends, the said arms being also provided with guide arms 286 that are adapted for wiping the sides of the frame plates 19 to stabilize the bracket during its movement.

Pivotally mounted on a rod 287 that is also carried by the frame plates 19 and extends transversely across the machine above and slightly forwardly of the rod 280, are latch members 288, each comprising a collar 289 that is rotatably mounted on the rod and bears against the adjacent frame plates to stabilize its pivotal movement. Formed integrally on each collar is a stop arm 291 that overlies the register wheel shaft 247 to limit the hanging movement of the latch, and a hook arm 292 that extends downwardly and forwardly at an angle from the collar and has a hook 293 that is adapted for engaging the upturned hook lip 294 on the forward end of the bracket body 281, the upper edge of said hook member 293 being inclined so that when the bracket is moved downwardly, the body lip will move over the inclined edge of the latch hook to move the hook out of its path so that the lip may resume locking engagement with the hook portion. The stop arm 291 of the latch member 288 is connected with the bracket member by a spring 295 so that the latch is urged downwardly and the bracket upwardly, downward movement of the latch being limited by engagement of the stop arm 291 with the register wheel shaft and upward movement of the bracket being limited by engagement of a tail 296 on the rear of the bracket with a cross bar 297 that extends transversely across the machine.

Each bracket is adapted for actuation by a register wheel of a fixed order and for advancing the rack plate of the selecting bar of a next higher order by the following mechanism: The arm 283 of each bracket has a stop-head 284 at its forward end, that is adapted for engagement with a lip 298 on the rack slide 260 of the selecting bar of the next higher order when the said selecting bar is returned to normal position under ordinary conditions, so that when the selecting bar returns after each actuation, except as hereinafter provided, the stop-head on the bracket arm 283 engages the slide lip 298 and holds the slide so that as the selecting bar continues its return movement, the slide remains stationary and the spring 279 is tensioned, so that should the rack member be in mesh with the pinion on the register wheel, the register wheel would not be given the full movement of which the rack is capable, the differential being sufficient to advance the register wheel from one figure to the next.

In order to obviate possible inaccuracy because of wear of the selecting bar we preferably provide the arm 283 with a supplemental stop 284' (Fig. XV) which is spaced from the head 284 a distance corresponding to a phase movement of the register, and which is adapted for engagement by the lip 298 on the rack slide to stop the slide after it has had a movement corresponding to such phase and thereby insure the proper slip movement of the slide.

On each of the register disks and on the side of the disks facing the register wheel of next higher order, is a pin 299 which is so arranged on its disk that as the register wheel revolves, the pin will engage the backwardly receding edge of the trip-head 285 of the adjacent bracket 281 to rock the bracket downwardly against tension of the spring 295 and move the stop-head 284 on that bracket out of the path of the lip 298 on the rack that is carried on the selecting bar that controls the register wheel of the next higher order, so that the rack is freed to the action of its spring 279 in order that it may recede and thereby actuate the next higher order register wheel and advance the said wheel one figure space, to carry over a unit to said wheel, the pin 299 being so arranged on the register disk that it will engage the bracket arm as the wheel turns to present the cipher to the register position.

With this arrangement when an actuating rack slide has been freed and operated as described, the lip 298 will assume a position back of the stop-head 284, but as the rear edge of the stop-board is inclined, when the selecting bar moves forwardly upon the succeeding operation of the machine, the lip will engage the inclined rear face of the stop-head and move the stop-head bracket against the tension of the spring 295 to permit the lip and the selecting bar to proceed to their full positions, wherein the lip will again be located in front of the stop member.

When the register wheels are in upper or registering position, the latch arms 291 are engaged by the register wheel shaft 247 and the latch arms 292 are held out of engagement with the lip 294 on the body of the bracket, so that when the register is lowered the latch bar 292 drops to the position illustrated in Fig. XII, wherein the tooth 293 is below the bracket lip 294, so that when the bracket is rocked downwardly by engagement of one of the pins 299 on an adjacent register wheel disk, the bracket lip rocks the latch bar so that the latter may drop automatically to position over the lip and hold the bracket down until the register resumes its upward position, and again lifts the latch to relieve the bracket when the latter returns under tension of the spring 295, so that the stop-head 284 may again be engaged by the lip 298 on the adjacent selecting bar rack. This locking of the bracket is to obviate any possibility of the stop-head returning to operative position before the rack slide has shifted and carried over the register wheel.

It is essential that in order to insure proper actuation of the register wheels, the said wheels be retained in their operative relation to the latch and selecting bars, during the entire rearward movement of said bars, and to effect such coöperation we provide a latch for holding the post arms 248 in their forward position, until the selecting bars have returned fully to their normal position. This latch mechanism comprises a trip 300 (Figs. XVII—XIX) which is pivotally mounted on a stud 301 that is fixed to the frame plate 10 and has a forwardly projecting arm 302 provided with a head 303 that is adapted for engagement by a pin 304 on the side of the arm 265 to prevent forward movement of the post arms and hold the register wheel shaft in its lowest position, when the arms 302 are elevated. The trip 300 has an arm 306 that is suspended into the path of a stud 307 that projects laterally from the shift bar 189 and is yieldingly urged to its uppermost position (where it may engage the pin 304) by a spring 308 that is connected with the arm 302 and with the pin 269 on the adjacent frame plate, so that the stop arm 302 is yieldingly urged to its upper position wherein the head 303 may be engaged by the pin 304 on the adjacent post arm.

The stud 307 on the shift bar is so positioned that when the bar is at the rearward limit of its movement it engages the suspended arm 306 of the trip and rocks the trip out of functional position so that the post arm may swing rearwardly to lift the register wheel shaft, but when the shift bar has moved forwardly the stud will move out of the way of the suspended arm so that the trip may lift under the influence of the spring 308.

It is also essential that after a figure has been printed on the record web the key posts, whereby that particular figure has been set, be returned to normal position so that another figure may be set up. This return of the key posts is effected automatically upon the return of the shift bar through the following mechanism.

Pivotally mounted on the shift bar, near the forward end thereof, is a rail 310 (Figs. XVI–XXI), having a rearwardly and upwardly inclined upper edge 311 and having a vertical slot 312 therein, through which a pin 313 on the shift bar is projected, a spring 314 having its ends connected with the pin 313 and with a lip 315 that projects laterally from the lower end of an ear 316 on the lower edge of the rail, so that the rail is yieldingly tensioned to its upper position and the upward movement thereof limited by the pin 313. The upper portion of the rail 310 is stamped laterally at the rear end of the rail, to form a cup 318, having an upwardly and rearwardly inclined bottom and a backwardly and laterally inclined bearing edge 319.

Slidably mounted in slots 320—320' in the side frame plates 9—10 and extending transversely across the machine and over the rail 310, just back of the cups 318, is a bar 321, having pins 322 thereon adapted for engaging the lower free edges of the wings 38 of the several selecting bar sets, when the bar 321 is moved to the right. The said bar 321 is also provided with a depending pin 323 that is adapted for travel along the inclined bottom of the cup 318 when the shift bar 189 is moved rearwardly, upon the initial actuation of the crank shaft, and along the rearwardly and laterally inclined edge 319 of the cup, when the shift bar is returned to its normal position, the forward movement of the shift bar causing the inclined track to engage the rounded lower end of said pin 323 during the forward movement of the shift bar, so that the rail 310 is moved downwardly on its pivotal mounting, and the inclined edge 319 engaging the side of the pin 323 when the shift bar is moved backwardly, to shift the bar 321 laterally and effect the releasing actuation of the wings 38, it being apparent that when the wings are moved laterally, as described, the key posts are released, as heretofore mentioned, so that they may again assume their normal positions.

With this automatic post returning mechanism the key posts, when lowered, are held by the wings 38, so that the crank shaft may be actuated to effect the printing of the figure and the registration thereof, and as soon as the crank handle is returned to normal position the key posts are automatically returned and that figure wiped out as far as the key posts and selecting bars are concerned.

If, however, it is desired to repeat the figure, that is, print the same figure a number of times in succession, we provide means for cutting out the automatic return mechanism so that the crank shaft may be operated repeatedly to print the same figure a number of times. This repeat mechanism comprises a key 325 which is fixed on the upper edge of the post 326 that is slidable vertically in the machine, but is normally, yieldingly retained in its upper position by a spring 327 which is attached to the post and to a pin 328 on the plate 9, the lower end of the post sliding in a slot 329 in a plate 330 that is mounted in the machine.

Fixed to the face of the post 326 is a stud 332, which is adapted for engaging the inclined upper edge of the rail 310, to lower the same against the tension of the spring 314, and thereby move the cup 318 out of position for engaging the pin 323 on the transverse slide bar 321, whereby the key post wings 38 are actuated.

With this mechanism, when it is desired to repeat a figure, the post 326 is lowered by pressure on the key button 325, so that the stud 332 rocks the rail 310 downwardly. The crank shaft may then be rotated to move the shift bar forwardly and back to repeat the printing and registration of the figure, it being apparent that the record web will be advanced to present new faces for the figure, and that the register wheel mechanism will be actuated with each shifting of the bar 189, so that the figure may be repeated as many times as desired and without releasing the key posts as long as the repeat key 325 is held depressed.

When the repetition of the figure is completed, however, the operator may remove pressure from the repeat key so that the rail 310 is allowed to lift and upon the last return of the shift bar 189 the key posts will be automatically released so that a new figure may be set up.

When a column of figures has been entered on the record web and it is desired to secure the total that is registered on the register wheels, the result is secured by what may be termed a reverse operation of the parts, in the following manner:

The total key mechanism comprises a slide bar 335 (Figs. XVI–XXI) which I will call the total slide bar to distinguish it from the main slide bar 189, and which is also adapted for guided travel through the brackets 189' and has an offset forward end 336 lying along the arm 265 on the register arm actuating shaft 249 and provided with a short slot 338 through which the pin 267 on said post arm is projected.

Slidably mounted in the machine frame and in a slot 340 in the plate 330, is the total key post 341, having a button 342 on its upper end and having a laterally directed lip 343 (Fig. XX) provided with a downwardly and inwardly inclined lower edge 344 adapted for engaging a pin 345 on the rear edge of the wing releasing slide bar 321, so that when the total key is depressed the lip 343 will engage the pin on the slide bar 321 to move said bar laterally and effect movement of the wings, so that the cipher stop teeth 69 on the wings 38 will be moved out of the sockets 68 in the several selecting bars, to clear all of the key posts, so the bars will be free to move when the crank shaft is actuated. In this way the total key may be used to release any key or keys that have been erroneously depressed and in this way serve the purpose of an error key.

The total key post is also provided with a rearwardly directed lip 347 having a downwardly and forwardly inclined lower edge 348 which is adapted for engaging a pin 349 on the total slide bar so that when the total key post is lowered the total slide bar will move rearwardly simultaneously with the actuation of the wing releasing bar. The total slide bar has an arm 350 on its upper edge, adjacent its forward end, provided with a laterally directed lip 351 which normally overlies the body portion of the trip arm 302 to limit the upward movement of said arm under tension of its spring 308, but as the movement of the total slide bar is independent of the main shift bar, the total bar moves forwardly while the main shift bar is stationary and before the trip is released, so that the lip 351 moves over the top of a stop boss 356 on the head 303 at the forward end of said arm 302 and assumes a position on the upper edge 354 of said head, which edge is higher than the upper edge of the body portion of the arm, and in advance of the stop boss 356 that is located at the rear of the head, the difference in elevation of the arm and head being sufficient to retain the forward end of the head out of position for engagement by the pin 304 on the post arm 265, when the parts are returned to normal position, but whereby the lip 351 is locked against forward movement by engagement with the stop member 356 so that should the operator accidentally remove his hand from the total key, the total shift bar will remain advanced sufficiently to retain the lip 351 on the upper edge of head 303 and thereby retain the head out of the path of the pin 304 so that the arms 248 may return and lift the register wheel shaft as soon as pressure is removed from the total key, and thereby avoid backward movement of the register wheels after the total is printed.

With the register wheel shaft in its lower position, the pinions on the register wheels are brought into mesh with the several rack members on the selecting bars, prior to the forward movement of the selecting bars. With the parts in this relation, when the crank is moved forwardly, all of the selecting bars move forwardly under tension of their springs, and, their racks being in mesh with the pinions on the register wheels, rotate said wheels during the entire forward movement of the bars, this movement of the wheels continuing until the pins 299 on the register wheel disks engage the rear stop heads 284 of the bracket arms 283, to stop the rotation of the register wheels and hold the selecting bars in position. The pins 299 are so arranged on the register disks that they will engage the heads 284 when rotated either forwardly or back, when the cipher on the disk is at register position, and, being so arranged, it is apparent that the duration of movement of the register wheel for totaling is proportionate to the size of the number showing through the register window.

With the arrangement shown in the drawings, the pin on each register wheel will be about opposite the numeral 4, so that if the cipher were showing through the register window the wheel would be held by the pin without any movement, whereas were the numeral 9 showing through the window the pin would be located at the front of the trip head, so that the wheel would make nearly a complete revolution before the pin would engage said head, thereby affording a relative long movement of the selecting bar.

As each of the register wheels operates independently of all of the others, it is apparent that each of the selecting bars may be moved a different distance, according to the numeral which is shown on the register, thereby setting the printing mechanism proportionately.

As a complete operation of the total printing has been completed when the crank shaft has moved forwardly to its limit, it is essential that the register wheels be returned to their registering position before the selecting bars start forwardly toward their normal position. This return of the register wheels is effected by the release of the total key, so that the spring 343 may return the key to its elevated position.

Immediately upon release of the total key a spring 360 that connects the ear 350 of the total shift bar with a pin 361 on the frame plate 9, will return the total shift bar to normal position, thereby releasing the post arms 248 that support the register shaft so that said shaft is elevated and the register wheels thrown out of mesh with the racks on the selecting bars.

As all of the register wheels have been stopped with the cipher at the register position, the register is ready for a new column or set of figures, so that accumulation may begin with the succeeding column.

As the register wheels are held down to mesh with the selecting bar racks by the total key, it is apparent that should the key be released before the total is printed the register wheels will rise and lose their connection with the racks, so that the total is lost and the column must be set up again. In order to obviate this possibility we provide for locking the total key down for the operative period of the selecting bars by locating a keeper shelf 362 Fig. XVII on the main shift bar 189 and a pin 362' on the total key post, both projecting laterally from facing sides of their carrying parts and so located that when the parts are in normal position the pin will lie at the forward end of and above the shelf, but when the key post is lowered and the shift bar advanced the shelf is moved over the pin to hold the key post down and keep the post in functional position until the shift bar has reached the end of its stroke and set the printing mechanism. The keeper is of such length that the pin may rise at the rear end of the shelf when the bar is at its forward position, but as the printing mechanism has been set at this point there is no longer any need for holding the register wheels.

As heretofore stated we provide for lifting the inked ribbon to print the total in a different color, and have described the lever 237 whereby the lifting is effected. Arm 239 of said lever is preferably projected between ears 363—364 on the total key post, so that when the post is lowered the lever is rocked to effect the shifting of the ribbon, and when the post rises the lever is shifted back to normal position to return the inked ribbon to the normal color.

As all of the selecting bars are not drawn back to their limit when the total is printed, and are released before the crank shaft is moved forwardly, unless some means be provided for holding the bars, they would jump back to their limit under the tension of their springs and would effect a jar and strain on the bars and connected elements. In order to obviate this sudden or jumping movement we provide a latch which becomes effective upon the operation of the totaling mechanism and which comprises the shaft 238 (Fig. II) that is rotatably mounted in the side frame members 9—10 and has a longitudinal groove 367 therein. Rotatably mounted on the shaft, adjacent each selecting bar, is an arm 368, having an ear 369 projected into the groove 367 in said shaft to abut against the edges of the groove, the ear being of less width than the groove so that it will have free movement therein.

The arm 368 has a tooth 370 on its free end that is adapted for engaging the ratchet 371 on the head of each selecting bar and each arm has a hook 372 thereon connected with a spring 373 that is anchored to the machine housing by a hook 37, so that the arm 368 is yieldingly and normally tensioned to position for engaging the ratchet on a relative selecting bar head. Fixed on the shaft 238 is an arm 375 which projects along the main shift bar 189 and is adapted for engagement by the bosses 376—377 thereon when the shift bar is at the opposite limits of its travel. Under normal conditions, that is, when the shift bar and the selecting bars are at the rearward limits of their travel, the arm 375 is engaged by the forward bars 376, so that the lower edge of the shaft groove engages the ear 369 on the arm 368 and holds said arm up against the tension of its spring. As the shift bar moves forwardly, however, and along the arm 375, the arm is released by the forward boss 376, and as the shift bar assumes its forward position the arm is engaged by the rear boss 377 and rocked to rock the shaft 238. Rocking of the shaft 238 moves the lower edge of the groove away from the tooth on the arm 368, so that said arm is free to move toward the selecting bar under tension of its spring and assumes its locking relation therewith, so that when the selecting bars are freed, following the release of the total key the said bars are held by the arms 368 and cannot jump back to create the jar heretofore mentioned.

It is also apparent that as the shift bar moves to the rearward limit of its travel, the arm 375 is again engaged by the rear boss 376 and the shaft 238 revolved to lift the arm 368 out of its locking engagement with the selecting bar, so that the latter may be free for movement as heretofore described.

Assuming that the machine is constructed and assembled as described, we will describe its operation in order to give a better understanding of the mechanical construction and its mode of operation.

Further assuming that it is desired to total a column of figures, the first of which is $309.00 the operation is as follows:

The key post 3 in the hundreds column, and the key post 9 in the units column, are pushed downwardly by pressure on the respective buttons. When the number 3 and the number 9 key posts, in their respective banks, are lowered, they rock their respective wing latches, because of the engagement of the rounded lower ends of the posts with the latch lips, so that the cipher stops are removed from the respective slots in the selecting bars and the stop lips 34 of the key posts positioned for engagement by their respective stop edges 52 on the selecting bars.

When the key posts have been depressed, the operator draws the crank handle forwardly and this forward movement of the handle carries the arms 79 forwardly out of the path of the stop rollers on the several selecting bars, so that the bars are released to the tension of their springs. The bars are then drawn forwardly, by said springs, until the stop faces 52 of the bars engage the relative key posts 31 in the banks where key posts have been depressed, when the selecting bars are stopped and held in these determined positions, the bars in the banks where no key posts have been depressed being stopped in the cipher positions by the cipher lips on the respective wings, but having sufficient movement to spread the respective rack slides one space when the bars are forwarded on return movement of the crank handle.

As the selecting bars move forwardly they drag the slides 124 forwardly relative distances, to position the slide lips 123 for stopping engagement with the rack arms 111, the hundreds column bar being moved but a relatively short distance so that the stop lip on the slide 124 for that column will be engaged by the third step of the arm 111, while the slide in the unit column is moved to its limit in order to be engaged by the last tooth in its relative rack arm in order to properly position the printing mechanism.

Under this forward movement of the selecting bars, the racks on the forward ends of said bars move idly beneath the register wheels, as the said wheels are held in their elevated positions and locked to the selecting bar frame. Upon the initial movement of the crank shaft, the cam 149 is moved beneath the roller on the rear arm of the lever 146 so that the roller immediately passes over the stepoff 150 and throws the link 143 and moves the latch rod 109 out of engagement with the forward edges of the type bars. Movement of the crank shaft also carries the cam 134 about, so that the roller 135 on the crank arm 136 rides down the cam and permits the shaft 112 to rotate, so that the rack arms 111 are allowed to lift under tension of their springs.

As the latch rod 109 moves forwardly it relieves its hold on the type bars, so that the latter have a limited forward movement, or until the hooks 90 rest on the lip 91' of the latch 91, this forward movement carrying the upper latches 94 forwardly therewith against the tension of their springs.

As the crank shaft continues to revolve, the rack arms 111 continue to lift until they engage the stop lips on the slides 124, and the upward movement of said rack arms lifts the type carriage 99 in order to carry the proper type to the printing position, the arm 111 for the hundreds column rising until the third or three figure notch engages its lip, the tens column arm being stopped at the cipher or initial position, the unit arm rising until it engages the last notch on its stop arm, and the two decimal column arms being also stopped at the initial or cipher position.

As the hundred and unit column type carriages are lifted, because of the lifting of their rack arms, the upper ends of the carriages engage the projected ends of their latches 94 to lift the latches out of engagement with the respective type bars, so that the type bars are freed and the latches moved back under tension of their springs, the two cipher column housings being stopped however before they reach the latch engaging position.

Continued forward movement of the crank shaft carries the cam 149 about until the roller 148 drops off the last stepoff 153, and this movement is sufficient to force the link 143 backwardly to engagement with the latch 91 and move the latch from its holding engagement with all of the type bars 85. As the type bars are all under tension from the actuating heads 155 at the lower points of engagement, the heads automatically rock the bars on their pivotal mountings and throw the type carriages 99 forwardly to printing position, where the type strike the inked ribbon against the record web and print the proper characters thereon.

While the type members of the tens and two decimal columns in the figure have not been released from their latches 94 because of the engagement of the carriage with said latches, all of the type bars in the machine to the right of the first active bar have been released automatically upon the lifting of the latch in the hundreds column, because of the overlapping arms 102, so that irrespective of the number of type sets utilized in the figure, all of the sets to the right of the first active one are rendered operative so that a complete figure may be printed.

As the crank shaft reaches the forward limit of its movement, it has carried the main shift bar 189 backwardly to its limit and as the selecting bars assume their rearward positions they rock the arm 248 backwardly to lower the register shaft, so that the pinions on the register wheels will mesh with the racks on the rear ends of the selecting bars and are ready to advance the register wheels when the selecting bars return on their forward travel.

As all of the register wheels are in the cipher position when they are lowered into mesh with the selecting bar racks upon the setting up of the first figure in the column, and as the figures on the register wheels are spaced equally throughout the circumference of the wheels, it is apparent that the rotation of a register wheel must be in proportion to the size of the number which is to be registered. This differential in the travel of the register wheels is accomplished by differential in the movement of the selecting bars. As before stated, in the illustration, the selecting bar in the hundreds column is moved rearwardly a shorter distance than is the selecting bar in the units column, so that as the crank shaft returns to its first position, the first and third selecting bars are moved forwardly therewith, but for different distances, the bar for the hundreds column being moved forwardly a distance equal to three of the rack teeth and the bar in the units column a distance equal to nine of the rack teeth. This movement rotates the register wheels a like distance, so that when the register wheels resume their normal positions, the hundreds wheel will show a three and the units wheel a nine, whereas the tens wheel will have been undisturbed and when returned will show the cipher to the register opening, the ciphers also appearing in the two decimal columns, so that a person observing the register will know that the figure just recorded was 309.00.

As the crank shaft returns to its normal position the arms 79 will push against the rollers 81 on the selecting bars and return the bars to their initial positions, the rotation of the shaft inducing return and relocking of the type bar mechanism, the return of the main shift bar 189 also inducing movement of all of the locking wings, whereby the key posts have been held depressed, through the lateral movement of the slide bar 321 that is induced by the cup flange 318 on the shift bar, so that when the crank shaft has again resumed its normal position all of the other parts are back to normal and ready for a succeeding operation.

Assuming further, however, that the next figure to be entered in the column is 309.00, it is unnecessary for the same key posts to be again depressed, as the figures may be repeated without repetition of the whole setting operation, which repetition is effected through the repeat key 325. In order to effect the repeat by means of the key 325, said key must be depressed before the crank shaft has started on its return movement, after its initial forward movement. This depression of the key 325 lowers the arm 310 that carries the socket flange 318 so that the flange is moved downwardly out of the path of the pins on the transverse slide bar 321, so that when the shift bar 189 is returned upon return movement of the crank shaft, the slide bar 321 is not engaged by the inclined edge of the socket flange and the latching wings are not relieved so that the key posts retain their depressed positions.

As soon as the crank shaft has returned to normal position after the movement for the first figure, the repeat key may be released, and upon a succeeding movement of the crank shaft the register wheels will be drawn down into mesh with the selecting bar racks and the printing mechanism operated to again print the figure 309, the register wheels being carried around to add the second figure to the first, so that when they are returned to registering position they will show a total of 618.00, the figure 1 in the tens column being carried over from the units by an operation in the registry mechanism, and not by any actuation of the selecting bar in said column. This carry-over from the units to the tens column is effected by means of the movement of the sliding rack on the selecting bar for the tens column, as mentioned in the preceding description. The racks 256 being slidably mounted on the selecting bars and engaged by the stop heads 285 of the brackets 281 when the selecting bars are moved forwardly so that the racks have a spread equalling 1 tooth movement.

As the register wheel in the unit column is moved 9 spaces at the first actuation of the mechanism, it will, on the second actuation, be moved past the cipher position and until the figure 8 is in registering position. As the pin 299 on the unit wheel is carried past the point where it engages the inclined head 285 of the bracket 281 on the second operation, it will rock said bracket so that the stop head 284, that is integral with the same bracket, is lowered out of the path of the lip 298 on the selecting bar rack of the tens column, so that the rack slide is subject to the action of the spring 279, and is moved backwardly one tooth space under tension of the spring.

As all of the register wheels are in mesh with their respective racks, the movement of the rack in the tens column effects corresponding movement of the register wheel in that column and moves the wheel one space, or from cipher to 1, so that the carry-over is effected to secure the proper registration. When the bracket is lowered to effect the release of the rack in the tens column it is held in such lowered position by the latch until the register wheels are again raised to their normal position, when the register wheel shaft engages the latch arm 291 to lift the latch and release the bracket, which then assumes its normal position. Other figures are then added to the column in a like manner, the register being operated to add the figures as they are progressively added to the column, so that the progressive total is always shown on the register.

When a column has been completed and it is desired to take the total, the total key is depressed and actuates the total shift bar 335 before the crank shaft is operated, this movement of the total shift bar toward the rear throwing the register shaft downwardly so that the pinions on the register wheels mesh with the respective bar racks before the selecting bars have moved.

As the total shift bar moves backwardly, its latch bar 351 moves over the arm 302 of the latch 300 and assumes a position in front of the stop 356. When the total key has been depressed and the register shaft lowered as described, the main crank shaft is revolved to allow the selecting bars to move rearwardly under the tension of their springs, the rearward movement of the bars effecting actuation of the register wheels in a direction reverse to that on the registering movement and until the pins 299 on the registering wheel disks engage the rear edges of the stops 284 of the respective brackets.

When this engagement takes place the register wheels are held and the rearward movement of the selecting bars is interrupted, so that the said bars are held in position which they would have assumed had the key posts for the several columns corresponding to the numbers on the register wheels have been lowered, the forward movement of the selecting bars effecting the rearward movement of the slides 124, so that the rack arms 111 of the printing mechanism engage the lips 123 and stop the type bars in position for printing the figures shown on the register wheel. This positioning of the parts is effected because of the arrangement of the pins 299 relative to the cipher position on the several register wheels.

As the pins 299, are, as before stated, located adjacent the figures 4 on said wheel, should the figure 4 be presented on one of the wheels, forward movement of the selecting bar and register wheel would continue until the pin 299 of that wheel had engaged a respective latch, thereby carrying the wheel around four spaces, and leaving the cipher at the register position, this movement being sufficient to present the figure 4 of the type mechanism to printing mechanism. If the figure 9 were uppermost on one of the register wheels the pin would be directly in front of the latch so that the wheel would pass through nearly one complete revolution before engaging the opposite face of the latch, thereby effecting a longer movement of the selecting bar for that wheel, that would be sufficient to present the numeral 9 to the printing position and return the cipher on the register wheel to the top point.

When the total key is depressed, all of the selecting bars are released because of the shifting of the latch wings, and it is apparent that each of the bars is permitted to move a distance represented by the figure on the register wheel, so that should one of the wheels register a cipher, the pin 299 on such wheel would immediately engage the ear 284 on the relative stop bracket to prevent movement of the selecting bar beyond the cipher position, so that the proper printing will be effected.

When the latch tooth 351 on the total shift bar engages the head 354 of the latch 300 it holds the latch down so that it will not engage the pin 304 on the post arm that carries the register wheel shaft, and that when the total key is released the latch head cannot engage said post to prevent movement of the post arms, so that immediately upon the release of the total key, after the printing has been effected, the register wheel shaft is raised to normal position and all the selecting bars are released because of the movement of the register wheel pins out of engagement with the stop members on the latch brackets. This release of the selecting bars would permit the bars to shoot backwardly under tension of their springs were it not for the engagement of the arm 368 with the respective ratchets 371 at the forward ends of the selecting bars, as heretofore described, so that the jar and strain on the machine, due to the sudden movement of the selecting bars is obviated.

When the total printing has been effected and the crank shaft is returned to normal position, the selecting bars are moved back to normal and the main shift bar 189 is returned to its normal position. As the shift bar returns it engages the latch 306 to rock the same out of the path of the tooth 351 on the total slide bar, so that the total slide bar may be returned under tension of its spring.

It is apparent therefore, that we have provided an adding or like machine, having an easy and simple mode of operation, and comprising a minimum number of parts.

Having thus described our invention, what we claim as new therein, and desire to secure by Letters-Patent, is:

1. An adding machine comprising an automatically movable printing member, an independently operable selecting member comprising means for selectively limiting travel of said printing member, means for selectively limiting travel of the selecting member, and means for resisting movement of the printing and selecting members.

2. In an adding machine, separate selecting and printing devices, independently and automatically movable to functional position, a control member for resisting travel of both of said devices, and means for selectively limiting travel of the selecting device.

3. In an adding machine, independently operable selecting and printing devices, yieldingly urged to functional position, means for limiting movement of the printing device relatively to movement of the selecting device, and a control member normally resisting movement of both the selecting and printing devices.

4. In an adding machine, independently operable selecting and printing devices, yieldingly urged to functional position, means for limiting movement of the printing device relatively to movement of the selecting device, a control member resisting movement of both the selecting and printing devices, and acting first to release the selecting device and then the printing device.

5. In an adding machine, independently operable selecting and printing devices, yieldingly urged to functional position, means for limiting movement of the printing device relatively to movement of the selecting device, a control member normally resisting movement of both the selecting and printing devices, and a series of key stops independently movable to position for engagement by the selecting device, whereby movement of the printing mechanism is determined by selection of a key stop.

6. In an adding machine, a control member type carrying mechanism, automatically movable first to set and then to printing positions, but normally restrained by the control member, means for selectively limiting travel of the type carrying mechanism to set position, and means for releasing said type carrying mechanism to effect the printing.

7. In an adding machine, a control member, type carrying mechanism potentially movable first to set and then to printing positions, but normally restrained by the control member, means for selectively limiting travel of the type carrying mechanism to set position, and means under the control of the control member movable to effect the printing upon primary movement of the control member and adapted for returning the type carrying mechanism to initial position upon secondary movement of the control member.

8. In an adding machine, a control member, type carrying mechanism, automatically movable first to set and then to printing positions, but normally restrained by the control member, means for selectively limiting travel of the type carrying mechanism, and means under the control of the control member for releasing said type carrying mechanism to effect the printing.

9. In an adding machine, a control member, type carrying mechanism potentially movable first to set and then to printing positions, but normally restrained by the control member, means for selectively limiting travel of the type carrying mechanism, and means under the control of the control member for releasing said type carrying mechanism to effect the printing upon primary movement of the control member and adapted for returning the type carrying mechanism to initial position upon secondary movement of the control member.

10. In an adding machine a control member, printing mechanism, comprising an adjustable type carriage, yielding means for striking the carriage to printing position, latch mechanism for restraining the printing mechanism, means under control of the control member for automatically setting the carriage, and means for selectively limiting setting movement of the type carriage.

11. In an adding machine a plurality of laterally spaced selecting bars, means for selectively limiting movement of each bar independently of the others, a plurality of slide members located adjacent to the bars and in spaced relation, but at distances less than the bar spacing, a link fixed to each bar and having an inturned portion connected with a relative slide, a type carriage for each selecting bar, means connected with each carriage and adapted for engaging a relative slide to limit movement of the carriage, and means for actuating the type carriages to effect a printing operation.

12. In an adding machine, normally independent selecting and printing devices, automatically movable to set position, means for selectively determining the travel of the selecting member, means normally restraining the selecting member and printing member and returning the same to initial position, whereby the functional position of a printing member is determined by set position of the selecting member.

13. In an adding machine, a longitudinally movable selecting bar having spaced stop portions and a stopping member, key posts for limiting movement of the bar, printing mechanism engageable with said stopping member to limit movement of the printing mechanism according to position of the bar, a single member controlling both the bar and printing mechanism, yielding means for urging the selecting bar to functional position upon operation of the control member, and means for urging the printing mechanism to functional positions upon operation of the control member.

14. The combination with a plurality of selecting members, of a series of key posts for each selective member, normally independent of but adapted for selectively determining travel of their selecting members, slotted frames, stop members slidably keyed on said frames, means connecting each selecting bar with a relative slide member, a type carriage for each selecting bar, means for actuating the type carriages, and means connected with the type carriages and adapted for engagement with the slide members to limit setting movement of the carriages.

15. The combination with a selecting bar, of a series of key posts for each selective member, normally independent of but adapted for selectively determining travel of their selecting members, a slotted frame plate, a stop member having a neck slidable in the plate slot and provided with a retaining head, whereby the stop member may travel on the plate but is held from displacement therefrom, a type carriage, means for actuating said carriage, and means connected with the carriage and adapted for engagement with the stop member, to limit movement of the carriage.

16. In an adding machine, independently operable selecting, type carriage and carriage striking members, and a single controlling device normally restraining all of said members and operable to release the selecting member, the type carriage and carriage striking member in respective order.

17. In an adding machine, independently operable selecting, type carriage and carriage striking members, and a single controlling device normally restraining all of said members and operable to release the members in respective order when operated in one direction and for returning said members in reverse order when operated in the opposite direction.

18. In an adding machine, independently operable selecting, type carriage and carriage striking members, a single controlling device normally restraining all of said members and operable to release the selecting member, the type carriage and carriage striking members in respective order, when operated on initial movement and to return said members in reverse order upon secondary movement.

19. In an adding machine, independently operable selecting, type carriage and carriage striking members, a single controlling device normally restraining all of said members and operable to release the selecting member, the type carriage and carriage striking members in respective order when operated on initial movement and to return said members in reverse order upon secondary movement, and a series of independently operable key posts for limiting movement of the selecting members.

20. In an adding machine, a selecting device, a type carriage and carriage striking mechanism, each independently and yieldingly urged to functional position, and a single control member normally restraining all of said devices and operable to release the same in the order named.

21. In an adding machine, a selecting device, a type carriage and a carriage striking mechanism, each independently and yieldingly urged to functional position, a single control member normally restraining all of said devices and operable to release the same in the order named and to return the said devices in reverse order and against the tension of their yielding means when operated in the opposite direction.

22. In an adding machine, independently operable selecting and type carrying members, means for selectively limiting travel of the selecting member, a stop movable with the selecting member, means connected with the type carrying member for engaging said stop to limit movement of the type carrying member to a position corresponding to position of the selecting member, means normally urging the selecting and type carrying members to set position, and control mechanism for first permitting movement of the selecting member and then movement of the type carrying member.

23. In an adding machine, independently operable selecting and type carrying members, means for selectively limiting travel of the selecting member, a stop movable with the selecting member, means connected with the type carrying member for engaging said stop to limit movement of the type carrying member to a position corresponding to position of the selecting member, means normally urging the selecting and type carrying members to set position, and control mechanism for first permitting movement of the selecting member and then movement of the type carrying member and finally throw of the type carrying member to printing position.

24. In an adding machine, independently operable selecting and type carrying members, means for selectively limiting travel of the selecting member, a stop movable with the selecting member, means connected with the type carrying member for engaging said stop to limit movement of the type carrying member to a position corresponding to position of the selecting member, means normally urging the selecting and type carrying member to set position and control mechanism for first permitting movement of the selecting member and then movement of the type carrying member and finally throw of the type carrying member to printing position upon primary movement and returning all of the parts to initial position upon secondary movement.

25. In an adding machine, a selecting member, means for selectively limiting movement of the selecting member, a slide operable by the selecting member and provided with a stop portion, a pivotally mounted arm having an arcuate rack adapted for engagement with the stop portion of said slide to limit movement of the arm according to position of the slide, and a type carriage connected with said arm and movable to set position upon actuation thereof.

26. In an adding machine, a slide member provided with a stop portion, a selecting member operatively connected with the slide, means for selectively limiting movement of the selecting member, a pivotally mounted arm having an arcuate rack adapted for engagement with the stop portion of said slide to limit movement of the arm according to position of the slide, a type carriage connected with said arm and movable to set position upon actuation thereof, means normally urging the selecting member and arm to functional positions, and a single control device for first permitting movement of the selecting member and then movement of the arm.

27. In an adding machine, a platen, a pivotally mounted bar, means yieldingly urging the bar toward the platen, a latch for normally restraining the bar, a type carrier slidable along the bar and cut away to expose an edge of the bar, and a returning member for engaging the exposed edge of said bar.

28. In an adding machine, type mechanism comprising a carrying member and a type carriage, the latter movable on the former, means for urging the carrying member to printing position, a latch for restraining said member, means for actuating the carriage, to set the carriage and release said carrying member from its latch, and means for limiting movement of said carriage at a determined position.

29. In an adding machine, type mechanism comprising a bar, means for throwing the bar to printing position, a latch for restraining said bar, a type carriage movable along the bar to set position and with the bar to printing position, means for selectively limiting setting travel of the carriage, and a control member for controlling movement of the carriage to set position.

30. The combination with printing mechanism, comprising a bar, of means for actuating said bar, primary and secondary latches for restraining said bar, a type carriage movable along the bar to set position, means for selectively limiting travel of the carriage, and a control member adapted for first permitting actuation of the carriage to position the same and release the primary latch and for finally permitting release of the secondary latch to permit functional movement of the printing mechanism.

31. In an adding machine the combination with printing mechanism, comprising a pivotally mounted bar, of yielding means for locking said bar, a primary latch for restraining said bar in initial position, a secondary latch for restraining the bar when released from the first named latch, a type carriage movable along the bar to set position and adapted for releasing the bar from the first named latch, selective means for limiting travel of the carriage, and a control member adapted for first releasing said selective means and then releasing the type carriage to set and release the primary latch, and for eventually releasing the secondary latch, for the purpose set forth.

32. The combination with a pivotally mounted bar, of means for actuating said bar, a latch for restraining said bar, a type carriage movable to set position, and adapted for releasing said primary latch, a secondary latch for restraining the bar in slightly advanced position after its release from the primary latch, selective mechanism for limiting travel of the carriage and control mechanism adapted for first permitting actuation of the carriage to set position and for releasing the latch, then permitting actuation of the secondary latch to release the bar, and finally for returning all of the parts to their initial positions.

33. The combination with a pivotally mounted bar, having primary and secondary latch portions, of primary and secondary latches adapted for independent engagement with relative bar portions, a type carriage slidably mounted on the bar and adapted for releasing the primary latch, whereby the secondary latch portion on the bar is permitted to engage the secondary latch, a stop member connected with the carriage, means adapted for engagement with said stop member to selectively limit travel of the type carriage, and mechanism for controlling movement of the stop member and carriage and effecting displacement of the secondary latch.

34. The combination with a pivotally mounted bar, having primary and secondary latch portions, of primary and secondary latches adapted for independent engagement with said portions, a type carriage slidably mounted on the bar and adapted for releasing the primary latch, whereby the secondary latch portion on the bar is permitted to engage the secondary latch, a stop member connected with the carriage, means adapted for engagement by the said stop member to selectively limit travel of the type carriage, and mechanism for controlling movement of the stop member and effecting displacement of the secondary latch, upon movement in one direction and for replacing the parts upon movement in the opposite direction.

35. The combination with a pivotally mounted bar, having primary and secondary latch portions, the primary and secondary latches adapted for independent engagement with relative bar portions, a type carriage slidably mounted on the bar and adapted for releasing the primary latch, whereby the secondary latch portion on the bar is permitted to engage the secondary latch, a stop member connected with the carriage, means adapted for engagement by the stop member to selectively limit travel of the type carriage, a control member for controlling movement of the stop member to set the type carriage and release the secondary latch upon initial movement and for resetting said type carriage upon secondary movement.

36. The combination with printing mechanism comprising a pivotally mounted bar, having primary and secondary latch portions, of a longitudinally and pivotally movable primary latch, adapted for engaging the primary latch portion of the bar, yielding means for moving the latch longitudinally, yielding means for actuating said bar when the latter is released from said latches, a type carriage slidably mounted on said bar to assume set position and actuate the primary latch to permit the latter to move out of the path of the bar under tension of its yielding means, to permit said bar to pass to holding engagement with the secondary latch, a stop arm connected with the type carriage and yieldingly urged to actuate the carriage, and means for selectively limiting movement of the stop arm.

37. In an adding machine, a plurality of independently operable printing bars, each normally urged to printing position, a latch for each bar, each latch having an arm overlying a latch of next higher order, whereby all lower order latches are actuated upon actuation of a high order latch, a type carriage movable along each bar and adapted for engaging the latches to trip the same and release the bars to effect a printing operation, and means for controlling and actuating the printing bars and carriages.

38. The combination with a pivotally mounted bar, having protuberances at opposite sides of its pivotal mounting, a head adapted for travel between the protuberances and having ears adapted for engagement therewith, yielding means for urging the head toward the protuberances, a latch for holding the bar against the tension of said spring, a type carriage slidable on said bar, a stop for limiting setting travel of the carriage, and means for selectively positioning said stop to determine the set position of the carriage.

39. The combination with a pivotally mounted bar, a latch for holding said bar in initial position, means for turning the bar on its pivotal mounting to effect a printing operation, a type carriage slidably mounted on the bar, selective mechanism for effecting a determined setting of the carriage, a latch for retaining said bar in set position, a hanger adapted for engaging said bar to return the same and for tripping said latch, and control mechanism for determining position of the setting mechanism and said hanger, for the purpose set forth.

40. In a machine of the character described, the combination with a shaft, of a bar pivotally mounted on said shaft and having protuberances at opposite sides thereof, a head slidably mounted on the shaft and having ears adapted for separate contact with the protuberances on said bar, a spring for yieldingly urging said head in one direction, a latch for retaining said bar in inclined position with one of said protuberances against the relative head ear, and with the spring under tension, a carriage slidably mounted on said bar and provided with type characters, a stop member connected with the type carriage, selective means for limiting travel of the stop member to limit travel of the carriage, yielding means for urging the stop member in one direction and a controlling device for said stop member.

41. In a device of the character described, the combination with a shaft, of a bar rotatably mounted on the shaft and having protuberances at opposite sides thereof, a selecting member comprising a slotted head that is slidably mounted in the shaft and provided with ears for separately engaging the protuberances on said bar, a spring for yieldingly urging said head in one direction, a latch for holding the bar in set position with one of the protuberances in engagement with a relative head ear and with the head spring under tension, a type carriage movable on the bar, a stop member operatively connected with the type carriage, selective mechanism for limiting movement of the type carriage, and a controlling device for controlling movement of the stop member and actuation of the bar latch.

42. The combination with a shaft, of a bar rotatably mounted on said shaft, having protuberances at opposite sides of its pivotal mounting and having spaced latch members, a head having ears adapted for separate contact with the bar protuberances and having a spring for urging the head toward the protuberances, a primary latch for holding the bar in set position, with the head spring tensioned, a type carriage slidable on said bar and adapted for engaging the primary latch to release the bar, a secondary latch adapted for holding engagement with the second bar latch member when the primary latch is released, a swinging member adapted for actuating the secondary latch to release the bar when moved in one direction and for returning said bar when moved in the opposite direction, a stop member operatively connected with the carriage, selecting mechanism for limiting movement of the stop member, and a controlling device for controlling movement of the selecting mechanism, the hanger and the stop member.

43. The combination with movable printing mechanism, of a latch for holding said mechanism in set position, a main crank shaft, an arm pivotally mounted on an axis parallel with the crank shaft and connected with the printing mechanism, a spring connected with said arm and normally urging the same to effect setting of the printing mechanism, selective mechanism for controlling the movement of said arm, a second arm pivotally mounted on an axis parallel with the crank shaft, means connected with the second arm for actuating the latch, a cam on the crank shaft, an arm on said axis, engaging said cam to limit movement of the axis under tension of the arm spring, a second cam on said shaft, and means on said axis for engaging said cam to limit movement of the latch controlling mechanism.

44. The combination with a pivotally mounted bar, of a carriage slidably mounted on said bar, a crank shaft, a cam on said crank shaft, a second shaft adjacent the crank shaft and parallel therewith, an arm pivotally mounted on the second shaft and connected with said carriage, yielding means for urging said arm in one direction to effect setting of the type carriage, selective mechanism for limiting movement of said arm, and means for actuating the pivotally mounted bar to effect the printing operation.

45. The combination with a pivotally mounted bar, of a carriage slidably mounted on said bar, a crank shaft, a cam on said crank shaft, a second shaft adjacent the crank shaft and parallel therewith, an arm pivotally mounted on the second shaft and connected with said carriage, yielding means for urging said arm in one direction to effect setting of the type carriage, selective mechanism for limiting movement of said arm, means for actuating the pivotally mounted bar to effect the printing operation, and means on the crank shaft for controlling said selective mechanism.

46. The combination with a pivotally mounted bar, of a carriage slidably mounted on said bar, a crank shaft, a cam on said crank shaft, a second shaft adjacent the crank shaft and parallel therewith, an arm pivotally mounted on the second shaft and connected with said carriage, yielding means for urging said arm in one direction to effect setting of the type carriage, selective mechanism for limiting movement of said arm, means for actuating the pivotally mounted bar to effect the printing operation, means on the crank shaft for controlling the said selective mechanism, a latch for normally retaining the pivotally mounted bar in set position, a cam on said crank shaft, having a step-off adjacent its end, and a lever on said shaft having an arm engaging said second cam and having connection with said latch whereby the latch is actuated when the first arm reaches the cam step-off.

47. The combination with printing mechanism, comprising a pivotally mounted bar, having primary and secondary latch members, of a primary latch for engaging a relative member on the bar to initially retain the same in set position, a secondary latch adapted for holding engagement with the second latch member when the bar is released by the primary latch, means normally and yieldingly urging the bar to printing position, a type carriage slidably mounted on said bar and adapted for engaging the primary latch to release said bar, a crank shaft and a shaft mounted adjacent and parallel with the crank shaft, an arm on said parallel shaft, having separate stops thereon, a link connecting said arm with the carriage, whereby the carriage is moved upon the pivotal movement of the arm, selective mechanism for limiting movement of said arm, yielding means for urging said arm toward the selective mechanism, a cam on said crank shaft, an arm fixed on the parallel shaft and engaging said arm to normally retain the parallel shaft in initial position, a hanger having a member adapted for engaging the said pivotally mounted bar and for engaging the second latch member, a lever on said parallel shaft having an arm connected with said hanger and having a second arm projected toward the crank shaft, a cam on said crank shaft having primary and secondary step-offs, yielding means for urging the lever to retain the cam arm in engagement with the cam, a stop on the selective mechanism, an arm on the crank shaft adapted for retaining engagement with said stop to limit movement of the selective mechanism, means for actuating said crank shaft whereby the type carriage is actuated to printing position and for releasing the primary latch and whereby the secondary latch is actuated upon movement of the crank shaft in one direction, and whereby the said members are reset upon movement of the crank shaft in the opposite direction.

48. The combination with register mechanism, of printing mechanism, means in the printing mechanism for advancing a paper strip and including a ratchet, selective mechanism for controlling the register and printing mechanisms, means for controlling the selective mechanism, a shift bar operatively connected with said controlling means, and with the register mechanism, a lever operable by the shift bar, and a pawl on said lever for actuating said ratchet.

49. The combination with register mechanism, of printing mechanism, means in the printing mechanism for advancing a paper strip and including a ratchet, selective mechanism for controlling the register and printing mechanisms, means for controlling the selective mechanism, a shift bar operatively connected with said controlling means, and having spaced lips stamped therefrom, a pivotally mounted lever having one end located between said lips, and a pawl on said lever for actuating the ratchet.

50. In an adding machine, a selecting device, printing and register mechanisms at opposite ends of the selecting device, means for selectively limiting the travel of said selecting device, and means for effecting co-operative relation between the printing and register mechanisms and selecting device when said device is positioned.

51. In an adding machine, a reciprocatory selecting device, a register mechanism operable by the selecting device, independently operable printing mechanisms having variable setting travel determined by the position of the selecting device, independent means normally urging the selecting device and printing mechanism to set position, a control member having operative relation with the selecting and printing mechanism to release the same when operated in one direction and return the same to normal position when operated in the other direction, and means for connecting said control member with the register mechanism to effect operative relation between the register mechanism and selecting device upon return movement of the selecting device.

52. In an adding machine, a plurality of individually operable selecting bars, a set of individually operable key members for each selecting bar, register mechanism, a controlling device for the selecting bars, means operable by the controlling device for positioning the register mechanism, a latch for each set of key members, and means operable by the register positioning means for moving all of said latches to release the key members.

53. In an adding machine, a plurality of individually operable selecting bars, a set of individually operable key members for each selecting bar, register mechanism, a controlling device for the selecting bars, means operable by the controlling device for positioning the register mechanism, a latch for each set of key members, and means operable by the register positioning means for moving all of said latches to release the key members when the controlling device is returned to initial position.

54. In an adding machine, a plurality of individually operable selecting members, a set of individually operable key members for each selecting member, register mechanism, a shift member for positioning the register mechanism, a latch for each set of key members, and means operable by the shift member for actuating said latches to release all of the key members upon a return movement of the shift member.

55. In an adding machine, a plurality of individually operable selecting members, a set of individually operable key members for each selecting member, register mechanism, a shift member for positioning the register mechanism, a latch for each set of key members, a tripping device for moving all of said latches to release the key members, and yielding means on the shift member movable by the latch when the shift member is moved in one direction and whereby the latch is moved when the shift member is moved in the opposite direction to actuate said latches and release the key members.

56. In an adding machine, a plurality of individually operable selecting members, a set of individually operable key members for each selecting member, register mechanism, a shift member for positioning the register mechanism, a latch for each set of key members, a tripping device for moving all of said latches to release the key members, yielding means on the shift member movable by the latch when the shift member is moved in one direction and whereby the latch is moved when the shift member is moved in the opposite direction to actuate said latches and release the key members, and a repeat key operable on the trip actuating device to remove the same from its sphere of influence on the trip.

57. The combination with a plurality of individually operable selecting bars, of a set of individually operable key members for each selecting bar, register mechanism, a shift bar for determining position of the register mechanism, a latch for each set of key members, a trip member adapted for moving all of said latches to release the key members, and a cam on the shift bar for actuating said trip member.

58. The combination with a plurality of individually operable selecting bars, of a set of individually operable key members for each selecting bar, register mechanism, a shift bar for determining position of the register mechanism, a latch for each set of key members, a trip bar extending transversely relative to the latches, pins on the trip bar adapted for rocking the latches, and means on the shift bar for moving the trip bar.

59. The combination with a plurality of individually operable selecting bars, of a set of individually operable key members for each selecting bar, register mechanism, a shift bar for determining position of the register mechanism, a latch for each set of key members, a trip bar extending transversely relative to the latches, pins on the trip bar adapted for rocking the latches, a shift pin on the trip bar, and a cam on the shift bar for engaging said shift pin, for the purpose set forth.

60. The combination with a plurality of individually operable selecting bars, of a set of individually operable key members for each selecting bar, register mechanism, a shift bar for determining position of the register mechanism, a latch for each set of key members, a trip bar extending transversely relative to the latches, pins on the trip bar adapted for rocking the latches, a shift pin on the trip bar, a cam pivotally mounted on the shift bar and adapted for engagement with the shift pin, and means for yieldingly urging the cam toward the shift pin.

61. The combination with a register, of a plurality of selecting members, means for actuating the selecting members, a shift bar for determining movement of the register relative to the selecting members, a set of key members for each selecting member, a latch for each set of key members, a trip for moving all of said latches, a bar movably mounted on the shift bar and having cam faces extending in different planes, yielding means for urging the bar toward the trip, and means on the trip for engaging one cam face to move the bar and for engaging the other face to be moved thereby.

62. The combination with a register, of a plurality of selecting members, means for actuating the selecting members, a shift bar for determining movement of the register relative to the selecting members, a set of key members for each selecting member, a latch for each set of key members, a trip for moving all of said latches, a bar movably mounted on the shift bar, yielding means for urging the bar toward the trip, a shift pin on the trip, a cam on said bar having an inclined face adapted for travel under and in engagement with the pin when the shift bar is moved in one direction to move the cam bar, and having a second inclined face adapted for engaging the side of the pin to move the trip when the shift bar is moved in the opposite direction.

63. The combination with a register, of a plurality of selecting members, means for actuating the selecting members, a shift bar for determining movement of the register relative to the selecting members, a set of key members for each selecting member, a latch for each set of key members, a trip for moving all of said latches, a bar movably mounted on the shift bar, yielding means for urging the bar toward the trip, a shift pin on the trip, a cam on said bar having an up-wardly and rearwardly inclined face and a forwardly and laterally inclined edge, whereby the cam bar is shifted upon forward travel of the shift bar and whereby the trip is shifted upon rearward movement of the shift bar.

64. The combination with a register, of selecting mechanism for the register, key members for limiting movement of the selecting mechanism, a latch for the key members, a trip for actuating said latch, a shift bar, and means for actuating the same, a slotted bar pivotally mounted on the shift bar, a pin on the shift bar projected through the slot in the pivoted bar, a spring connected with said pin and with the pivoted bar to urge the pivoted bar toward said trip, a two-faced cam on the pivoted bar, and a pin on said trip for engaging one cam face to rock the pivoted bar when the shift bar is moved in one direction and for engaging the other cam face to move the trip when the shift bar is moved in the other direction.

65. The combination with a register, of selecting mechanism for the register, key members for limiting movement of the selecting mechanism, a latch for the key members, a trip for actuating said latch, a shift bar and means for actuating the same, a slotted bar pivotally mounted on the shift bar, a pin on the shift bar projected through the slot in the pivoted bar, a spring connected with said pin and with the pivoted bar to urge the pivoted bar toward said trip, a two-faced cam on the pivoted bar, and a pin on said trip for engaging one cam face to rock the pivoted bar when the shift bar is moved in one direction and for engaging the other cam face to move the trip when the shift bar is moved in the other direction, and a repeat key adapted for holding the pivoted bar out of functional position.

66. The combination with a register, of selecting mechanism, for the register, key members for limiting movement of the selecting mechanism, a latch for the key members, a trip for actuating said latch, a shift member on said trip, a shift bar, and means for actuating the same, a bar movably mounted on the shift bar and having a cam adapted for engaging the trip shift member, a spring for urging the cam bar toward the trip, and a repeat key adapted for holding the cam bar in non-functional position against the tension of said spring.

67. The combination with a register, of selecting mechanism, for the register, key members for limiting movement of the selecting mechanism, a latch for the key members, a trip for actuating said latch, a shift member on said trip, a shift bar, and means for actuating the same, a bar pivotally mounted on said shift bar, a cam on the pivoted bar adapted for engaging the shift member on the trip, a spring for urging the cam bar to functional position, a repeat key, and a pin on the repeat key for holding the cam bar against the tension of its spring.

68. In an adding machine, a plurality of spaced and independently operable selecting members, a rack slidably mounted on each member and yieldingly urged in one direction, a shaft arranged transversely of said selecting members and movable toward and from the rack, a plurality of independently operable register wheels rotatably mounted on said shaft, each having a pinion adapted for meshing with one of the racks and having a stop member projecting from its side face, a bracket pivotally mounted between the selecting members and having a portion for stopping engagement with a rack and a separate portion for engagement with a stop member on a register wheel of lower order, a pivotally mounted latch having an arm overlying the register wheel shaft to rise and fall therewith, and a separate arm for engaging the bracket to retain the same depressed when said bracket is lowered through the intermediacy of a register wheel.

69. In an adding machine, a plurality of spaced and independently operable selecting members, a rack slidably mounted on each member and yieldingly urged in one direction, a shaft arranged transversely of said selecting members and movable toward and from the rack, a plurality of independently operable register wheels rotatably mounted on said shaft, each having a pinion adapted for meshing with one of the racks and having a stop member projecting from its side face, a bracket pivotally mounted between the selecting members and having a portion for stopping engagement with a rack and a separate portion for engagement with a stop member on a register wheel of lower order than that corresponding with said rack, a pivotally mounted latch having an arm overlying the register wheel shaft to rise and fall therewith and a separate arm for engaging the bracket to retain the same depressed when said bracket is lowered through the intermediacy of a register wheel, and a spring connecting the shaft arm of said latch with said bracket to yieldingly urge said members toward each other.

70. In an adding machine, a plurality of spaced and independently operable selecting members, a rack slidably mounted on each member and yieldingly urged in one direction, a shaft arranged transversely of said selecting members and movable toward and from the rack, a plurality of independently operable register wheels rotatably mounted on said shaft, each having a pinion adapted for meshing with one of the racks and having a stop member projecting from its side face, a bracket pivotally mounted between the selecting members and having a portion for engagement with a stop member on a register wheel of lower order than that corresponding with said rack, a pivotally mounted latch having an arm overlying the register wheel shaft to rise and fall therewith and a separate arm for engaging the bracket to retain the same depressed when said bracket is lowered through the intermediacy of a register wheel, a spring connecting the shaft arm of said latch with said bracket to yieldingly urge said members toward each other, a fixed stop member in the machine, and a tail member on said bracket for engaging said stop member to limit movement of the bracket under tension of said spring.

71. In an adding machine, a plurality of spaced selecting members each having a slidable rack provided with a stop lip, means yieldingly urging said rack along its selecting member, a plurality of independently operable register wheels each having a pinion for meshing with a rack and provided with a trip member, a bracket pivotally mounted between adjacent selecting arms comprising a body part and a slide arm projected forwardly of the body part, one of said slide arms having a stop head for engagement with the stop lip of an adjacent rack and the other arm having a cam head for engagement by the trip member of an adjacent register wheel, a shaft rotatably mounting the register wheels, a pivotally mounted latch having an arm overlying said shaft and having an arm projected between the bracket arms and provided with a hook for engaging the bracket body, and yielding means for connecting the latch and bracket to urge the same toward each other.

72. The combination with a register comprising individually operable members, a selecting bar for each register member, yielding means for moving the selecting bars to set position when unrestrained, means for restraining the bars and returning the same to initial position, an individual primary stop for limiting setting movement of each bar to one phase of register movement, selective stops for limiting movement of the bars at determined positions, a rack slidably mounted on each selecting bar, a spring for urging each rack to initial position, means for moving the register wheels to operative engagement with the racks when the bars are in set position and for returning the register wheels, a lip on each rack, a pin on each register wheel, a bracket adapted for pivotal movement between adjacent actuating bars and having a stop for engagement with the rack lip of a high order bar and a cam for engagement by the pin of a low order wheel whereby the bracket is rocked to release the rack when engaged by the pin.

73. The combination with a register comprising individually operable members, a selecting bar for each register member, yielding means for moving the selecting bars to set position when unrestrained, means for restraining the bars and returning the same to initial position, an individual primary stop for limiting setting movement of each bar to one phase of register movement, selective stops for limiting movement of the bars at determined positions, a rack slidably mounted on each selecting bar, a spring for urging each rack to initial position, means for moving the register wheels to operative engagement with the racks when the bars are in set position and for returning the register wheels, a lip on each rack, a pin on each register wheel, a bracket adapted for pivotal movement between adjacent selecting bars and having a stop for engagement with the rack lip of a high order bar and a cam for engagement by the pin of a low order wheel whereby the bracket is rocked to release the rack when engaged by the pin, and guide arms on the bracket for wiping the bars.

74. The combination with a register comprising individually operable members, a selecting bar for each register member, yielding means for moving the selecting bars to set position when unrestrained, means for restraining the bars and returning the same to initial position, an individual primary stop for limiting setting movement of each bar to one phase of register movement, selective stops for limiting movement of the bars at determined positions, a rack slidably mounted on each selecting bar, a spring for urging each rack to initial position, means for moving the register wheels to operative engagement with the racks when the bars are in set position and for returning the register wheels, a lip on each rack, a pin on each register wheel, a bracket adapted for pivotal movement between adjacent selecting bars and having a stop for engagement with the rack lip of a high order bar and a cam for engagement by the pin of a low order wheel whereby the bracket is rocked to release the rack when engaged by the pin, a stop rail, yielding means for returning the bracket after a rocking movement, and a tail on the bracket for engaging the stop rail to limit movement of the bracket.

75. The combination with a register comprising individually operable members, a selecting bar for each register member, yielding means for moving the selecting bars to set position when unrestrained, means for restraining the bars and returning the same to initial position, an individual primary stop for limiting setting movement of each bar to one phase of register movement, selective stops for limiting movement of the bars at determined positions, a rack slidably mounted on each selecting bar, a spring for urging each rack to initial position, means for moving the register wheels to operative engagement with the racks when the bars are in set position and for returning the register wheels, a lip on each rack, a pin on each register wheel, a bracket adapted for pivotal movement between adjacent selecting bars and having a stop for engagement with the rack lip of a high order bar and a cam for engagement by the pin of a low order wheel whereby the bracket is rocked to release the rack when engaged by the pin, the stop member having a tooth spaced rearwardly therefrom a distance relative to a phase of movement of the register wheel and adapted for engagement by the rack lip to insure stoppage of the rack in determined normal position.

76. The combination with a register comprising individually operable members, a selecting bar for each register member, yielding means for moving the selecting bars to set position when unrestrained, means for restraining the bars and returning the same to initial position, an individual primary stop for limiting setting movement of each bar to one phase of register movement, selective stops for limiting movement of the bars at determined positions, a rack slidably mounted on each selecting bar, a spring for urging each rack to initial position, means for moving the register wheels to operative engagement with the racks when the bars are in set position and for returning the register wheels, a lip on each rack, a pin on each register wheel, a bracket adapted for pivotal movement between adjacent selecting bars and having a stop for engagement with the rack lip of a higher order bar and a cam for engagement by the pin of a low order wheel whereby the bracket is rocked to release the rack when engaged by the pin, a stop lip on the bracket, a lever having an arm overlying the register mechanism and having a hooked arm adapted for engaging the bracket lip to hold the bracket in release position.

77. The combination with a register comprising individually operable members, a selecting bar for each register member, yielding means for moving the selecting bars to set position when unrestrained, means for restraining the bars and returning the same to initial position, an individual primary stop for limiting setting movement of each bar to one phase of register movement, selective stops for limiting movement of the bars at determined positions, a rack slidably mounted on each selecting bar, a spring for urging each rack to initial position, means for moving the register wheels to operative engagement with the racks when the bars are in set position and for returning the register wheels, a lip on each rack, a pin on each register wheel, a bracket adapted for pivotal movement between adjacent selecting bars and having a stop for engagement with the rack lip of a high order bar and a cam for engagement by the pin of a low order wheel whereby the bracket is rocked to release the rack when engaged by the pin, a stop lip on the bracket, a lever having an arm overlying the register mechanism and having a hooked arm adapted for engaging the bracket lip to hold the bracket in release position, and a spring connecting the overlying arm and bracket whereby the bracket is urged to normal position.

78. The combination with a plurality of individually operable selecting members, of printing mechanism controllable by the selecting members, register wheels movable to operative engagement with the respective selecting members, total key mechanism for inducing movement of the wheels to engagement with the selecting members, stops for limiting travel of the wheels and selecting members when the wheels reach determined register positions, springs for urging the selecting members backwardly, control mechanism for releasing and returning the selecting members, a shift bar operable by the controlling mechanism, a projection on the total key mechanism, and a keeper on the shift bar for overlying the projection during travel of the selecting members.

79. The combination with selecting mechanism, of printing mechanism under control of the selecting mechanism, register mechanism adapted for engaging the selecting mechanism to limit movement of the selecting mechanism, total key mechanism for moving the register mechanism to engagement with the selecting mechanism, and including a shift bar, having spaced projections, an arm adapted for engagement with said projections at opposite limits of movement of the shift bar, and latch mechanism operably connected with the said arm and adapted for controlling movement of the selecting mechanism.

80. The combination with a plurality of individually operable selecting bars, each having latch teeth, means for urging said bars toward set position, printing mechanism controllable by said bars, means for resisting movement of the bars, a register comprising individually operable wheels adapted for engaging the selecting bars, a shift bar operably connected with the register mechanism, a total key for actuating the shift bar, spaced ears stamped from the shift bar, a rotatable shaft, latch teeth on the shaft adapted for engaging the latch teeth on the selecting bars, and an arm fixed to said shaft and projected between the projections on the shift bar, for the purpose set forth.

81. The combination with a plurality of individually operable selecting bars, each having latch teeth, means for urging said bars toward set position, printing mechanism controllable by said bars, means for resisting movement of the bars, a register comprising individually operable wheels adapted for engaging the selecting bars, a shift bar operably connected with the register mechanism, a total key for actuating the shift bar, spaced ears stamped from the shift bar, a rotatable shaft, having a longitudinal groove, latch teeth rotatable on the shaft and having ears projected into the groove and adapted for engagement with opposite edges thereof, springs connected with the latch teeth for urging said teeth to engagement with the teeth on the selecting bars, and an arm fixed on said shaft and adapted for engagement with the projections on the shift bar.

82. The combination with selecting mechanism, of a register mechanism operable by the selecting mechanism, a shift bar operably connected with the register mechanism, a lever having an arm adapted for engagement with the register mechanism to hold said mechanism and having an arm lying along the shift bar, a spring for urging the lever to functional position, and a stud on the shift bar for engaging the adjacent lever arm to hold the arm in non-functional position when the shift bar is normal and for releasing the lever when the shift bar is moved, and means for moving the shift bar.

83. The combination with selecting mechanism, of printing mechanism controllable by the selecting mechanism, means for controlling actuation of the selecting mechanism, register mechanism, means operable by said controlling means for moving the register to operative engagement with the selecting mechanism, whereby the register mechanism is operated when the selecting mechanism is moved in one direction, a locking device for holding the register in operative position, separate means for moving the register to position for engaging the selecting mechanism whereby movement of the selecting mechanism is limited by the register mechanism, and an element in said separate means for holding the locking device in nonfunctional position.

84. The combination with reciprocating selecting bars, of racks slidable on said bars and adapted for limited movement independent of the bars, equal to a phase of register movement, a stop member on each rack, an independently rotatable register wheel for each selecting bar, a stop pin on each wheel, means for moving the wheels to operative engagement with the bar racks, brackets pivotally mounted between adjacent bars, each comprising an arm having a forwardly facing stop, adapted for holding engagement with the rack stop of a relatively high order and an arm having a forwardly facing cam adapted for engagement by the stop pin of a relatively low order register wheel to rock the bracket and release the high order rack, and a rearwardly facing stop on the cam arm adapted for engagement by the wheel pin when the wheel is reversed to limit movement of the wheel and its engaging rack and selecting bar, and printing mechanism controllable by the selecting bars.

85. In an adding machine, selecting mechanism, means for selectively determining travel of said mechanism, a pivotally mounted register, a shifting device for throwing the register into coöperative relation with the selecting mechanism, a shift bar for actuating said shifting device, a control member for the selecting mechanism having operative relation with the shift bar, whereby coöperative relation between the register and selecting mechanism is effected upon movement of the control member to one limit of its travel, a total shift bar for effecting such coöperation at the opposite limit of movement of the selecting mechanism, a latch releasable by movement of the main shift bar to position for retaining the register mechanism in functional position, and means operable with the total shift bar to retain the latch in nonfunctional position when the register mechanism is operated by said total shift bar.

86. In an adding machine, selecting mechanism, a register movable to operative relation with the selecting mechanism, a stop movable with the register, a shift bar for actuating said register, a control member for controlling movement of the selecting mechanism and operatively connected with said shift bar, a latch member yieldingly urged to position for engagement with said stop, means on the shift bar for normally retaining said latch against the tension of its yielding means, a total shift member for actuating said register independently of the main shift bar and having a retaining member movable to position for retaining the latch in non-functional position when the total shift bar is actuated to move the register, and means for actuating the total shift member.

87. In an adding machine, selecting mechanism, register mechanism, an arm for moving the register mechanism to coöperative relation with the selecting mechanism, and provided with a stop member, a protuberance on said shift bar, a latch having an arm for engaging the stop member on the register arm and a second arm for engagement by said protuberance when the shift bar is in normal position to retain the stop arm out of functional position, means for yieldingly moving the latch to carry said stop arm into position for engagement with the stop member on the register shift arm when the latch is released by movement of the register shift arm, and having a retaining member movable over the latch to retain the latch in non-functional position when the total shift bar is actuated to move the register shift arm.

88. In an adding machine, a selecting mechanism, register mechanism, a shift arm for moving the register mechanism into operative relation with the selecting mechanism and comprising a stop member, a shift bar having a protuberance thereon, a latch having an offset head member movable into the path of the stop member on said shift arm to retain said arm in a set position and having an arm for abutment by the protuberance on the shift bar to retain said stop head out of functional position, a total shift bar operatively connected with the register shift arm and having a retaining member in non-functional relation to the latch when the total shift bar is idle and movable over said head to retain the latch in non-functional position when the total shift bar is operated, means for actuating the total shift bar, a control member for effecting movement of the selecting mechanism and operatively connected with said shift bar, and printing mechanism movable to set position under control of the selecting mechanism.

89. In an adding machine, selecting mechanism, register mechanism, means for shifting the register mechanism comprising an arm having a lateral stud, a shift bar having a slot therein into which the stud on the shift arm is projected, whereby the shift arm is actuated upon movement of the shift bar, a total shift bar having a slotted portion into which said stud is projected whereby the shift arm is actuated upon movement of the total shift bar, a latch for restricting movement of the shift arm, means on the shift arm for normally retaining said latch out of functional position, and a retainer on a total shift bar movable into position for engaging said latch to restrain the latch upon movement of said total shift bar.

In testimony whereof we affix our signatures.

BENJAMIN P. HAYES.
FRANK D. LAUGHLIN.

Copies of this patent may be obtained for five cents each, by addressing the "Commissioner of Patents, Washington, D. C."